(12) United States Patent
Diederich

(10) Patent No.: US 7,862,290 B2
(45) Date of Patent: Jan. 4, 2011

(54) FLUID ENERGY-HARNESSING APPARATUS

(76) Inventor: Jürgen Diederich, 3304 Berta La., Lafayette, CA (US) 94549

( * ) Notice: Subject to any disclaimer, the term of this patent is extended or adjusted under 35 U.S.C. 154(b) by 914 days.

(21) Appl. No.: 11/744,368

(22) Filed: May 4, 2007

(65) Prior Publication Data

US 2008/0007069 A1    Jan. 10, 2008

Related U.S. Application Data

(60) Provisional application No. 60/746,606, filed on May 5, 2006.

(51) Int. Cl.
 *F03D 5/02* (2006.01)
(52) U.S. Cl. .................. 415/5; 416/8; 416/17; 416/116
(58) Field of Classification Search .................. 415/5; 416/7, 8, 17, 112, 113, 116, 117
 See application file for complete search history.

(56) References Cited

U.S. PATENT DOCUMENTS

| 443,641 | A | | 12/1890 | Eastman | |
|---|---|---|---|---|---|
| 1,502,296 | A | | 7/1924 | Doak | |
| 1,526,631 | A | * | 2/1925 | Fagan | 416/8 |
| 2,758,814 | A | * | 8/1956 | Kratz | 415/5 |
| 3,882,320 | A | * | 5/1975 | Schmeller | 290/43 |
| 4,049,300 | A | | 9/1977 | Schneider | |
| 4,494,008 | A | | 1/1985 | Patton | 290/44 |
| 4,563,168 | A | | 1/1986 | Schneider | |
| 4,756,666 | A | | 7/1988 | Labrador | 416/8 |
| 4,859,146 | A | | 8/1989 | Labrador | 416/8 |
| 5,684,335 | A | | 11/1997 | Ou | 290/54 |
| 6,072,245 | A | | 6/2000 | Ockels | 290/55 |
| 6,809,430 | B2 | * | 10/2004 | Diederich | 290/54 |
| 6,992,402 | B2 | * | 1/2006 | Latyshev | 290/55 |

FOREIGN PATENT DOCUMENTS

| FR | 2474106 A1 | 7/1981 |
|---|---|---|
| FR | 2689184 A1 | 10/1993 |
| JP | 55128669 A | 10/1980 |
| JP | 57151074 A | 9/1982 |

* cited by examiner

*Primary Examiner*—Edward Look
*Assistant Examiner*—Ryan H Ellis
(74) *Attorney, Agent, or Firm*—James F. Hann; Haynes Beffel & Wolfeld LLP

(57) ABSTRACT

Apparatus for harnessing energy from wind comprises upper and lower continuous-loop trackways defining a continuous loop path and a series of connected, movable wind foils. Each wind foil has a leading edge mast engaging and guided by the upper and lower trackways. Each wind foil is movable between first and second orientations when moving along first and second portions of the path. A second example comprises a support structure having upper and lower closed loop trackways having inner and outer trackway rails and defining a closed loop path which guides a series of connected trolleys. Each trolley has a roller mounted to a roller support. The roller is guided by the rails of the upper and lower trackways. Sail assemblies each have a mast and a sail extending from the mast, with the upper and lower ends of the mast mounted to and supported by upper and lower trolleys.

18 Claims, 27 Drawing Sheets

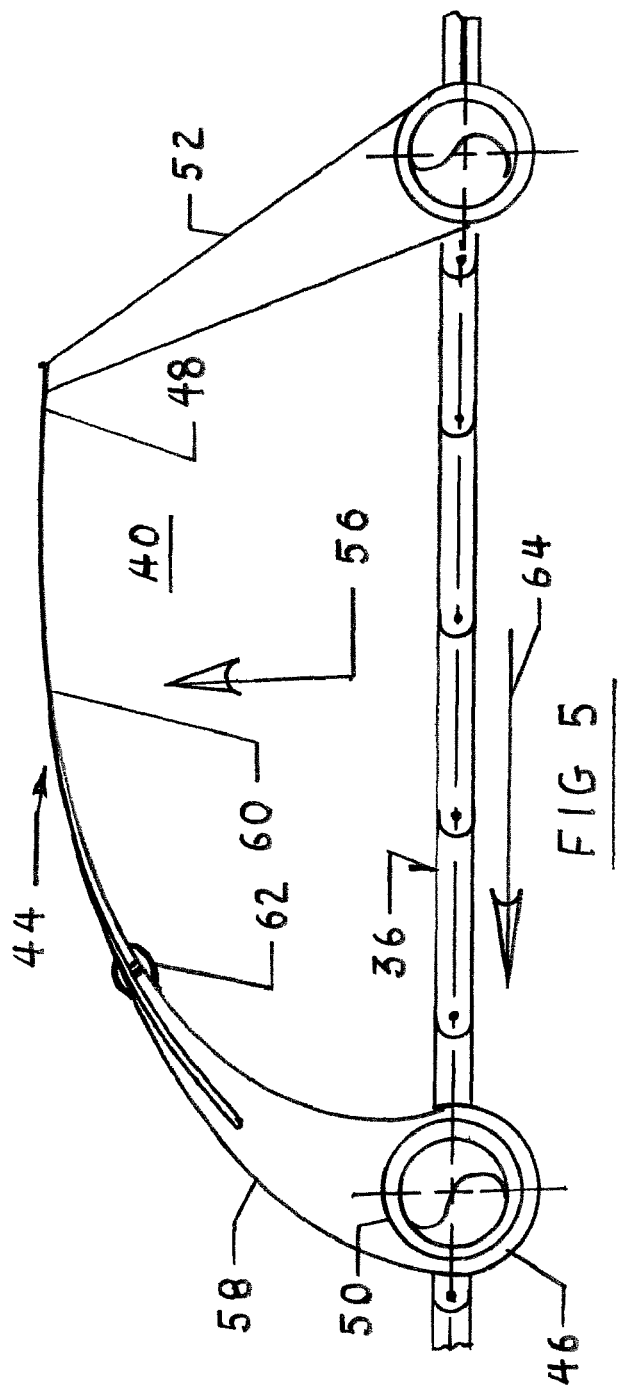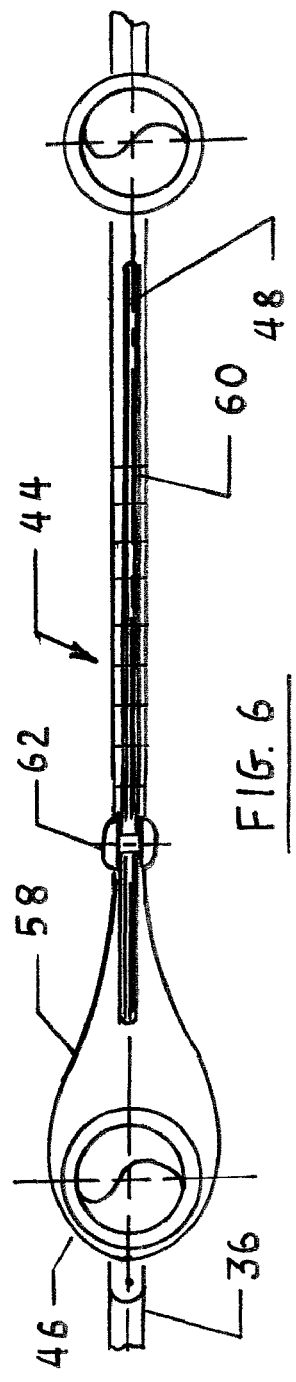

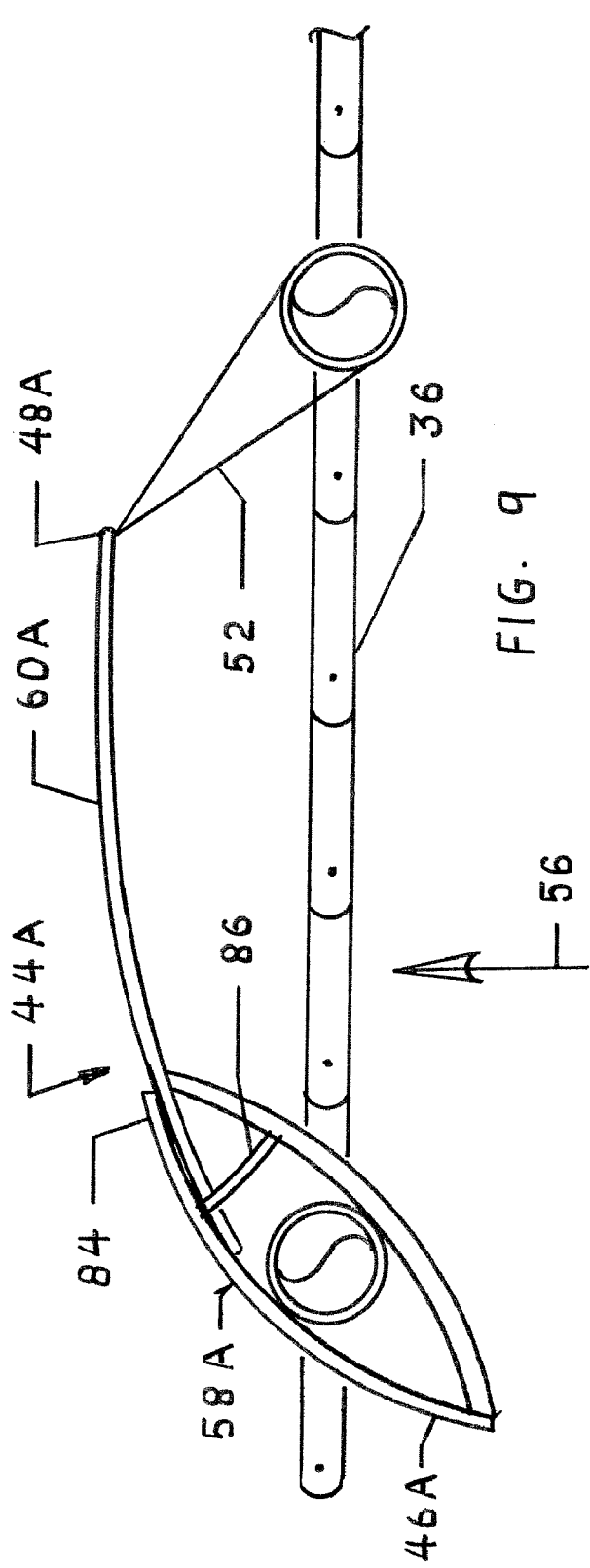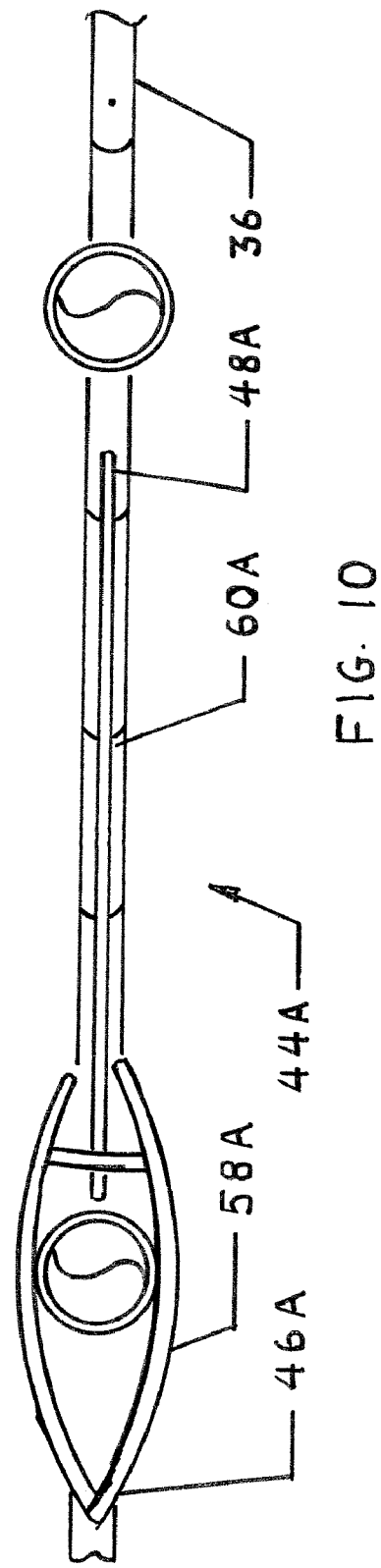

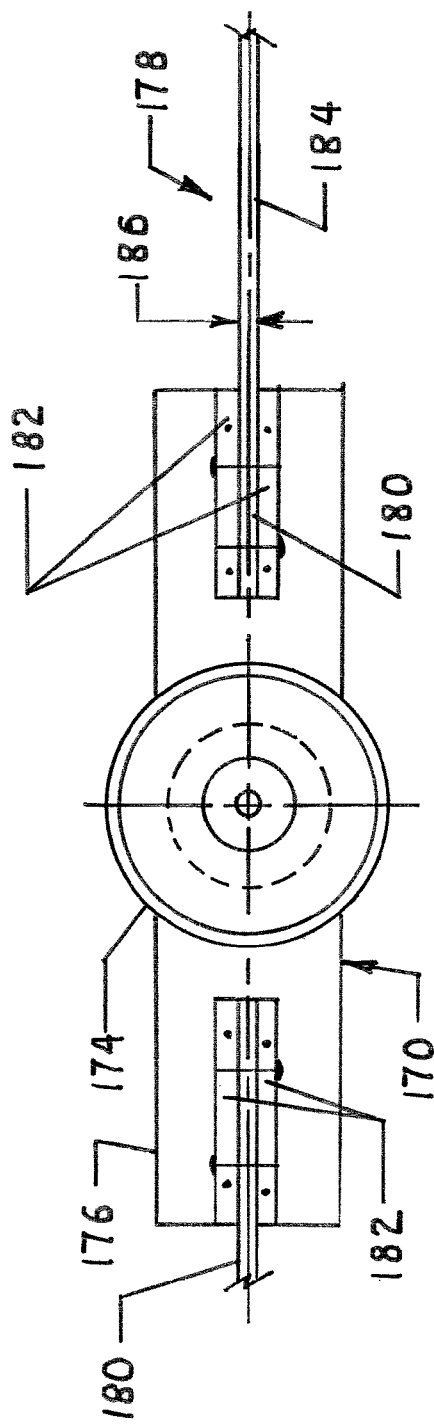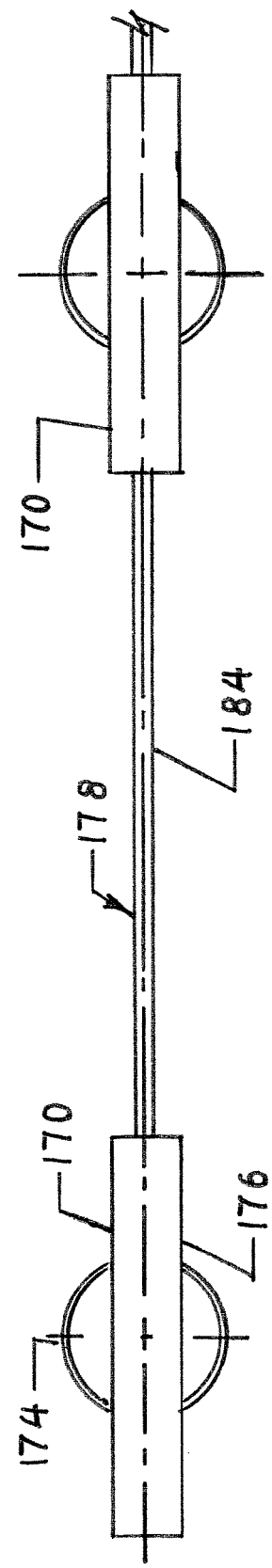

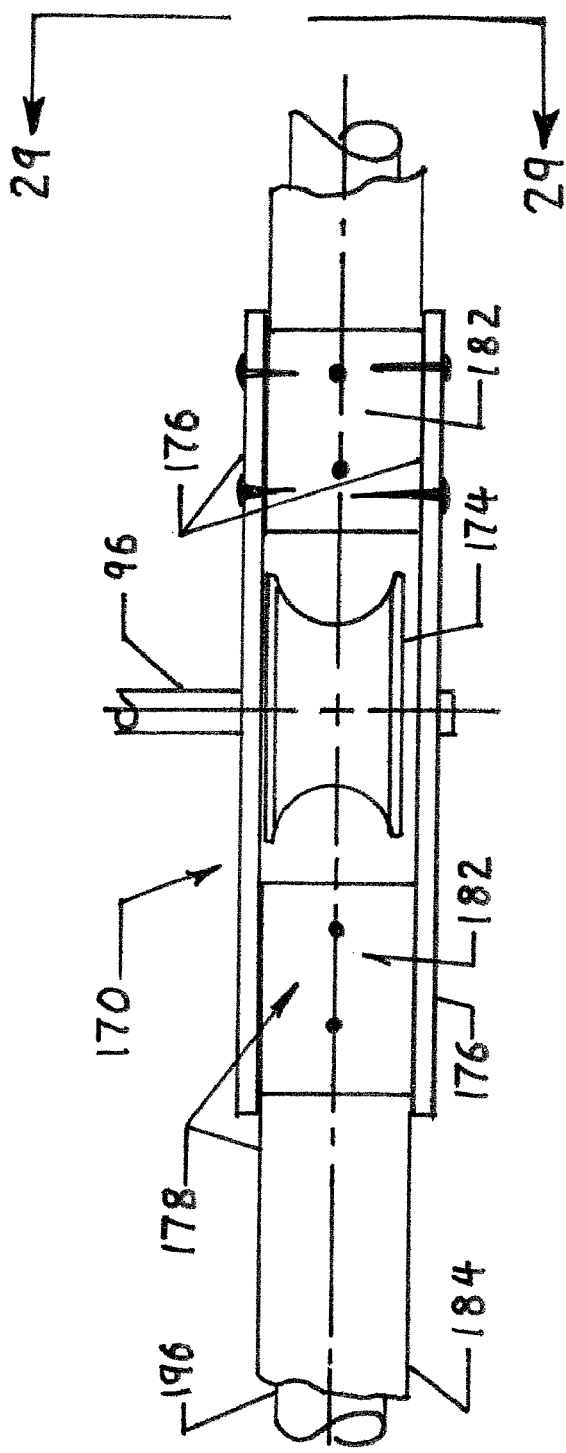
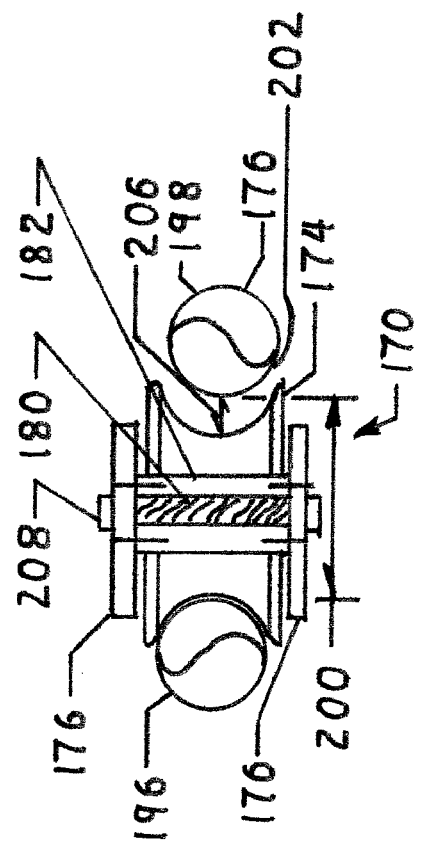
FIG. 30
FIG. 29

FLUID ENERGY-HARNESSING APPARATUS

CROSS-REFERENCE TO OTHER APPLICATIONS

This application claims the benefit of U.S. provisional patent application number 60/746,606, filed 5 May 2006, entitled FLUID ENERGY-HARVESTING APPARATUS. This application is related to International Application No. PCT/US 2004/028916 filed 3 Sep. 2004, published 16 Mar. 2006 as International Publication Number WO 2006/028454 A2, and entitled CONVEYOR-TYPE FLUID ENERGY-HARNESSING APPARATUS. This application is also related to U.S. Pat. No. 6,809,430 issued 26 Oct. 2004.

STATEMENT REGARDING FEDERALLY SPONSORED RESEARCH OR DEVELOPMENT

None.

REFERENCE TO MICROFICHE APPENDIX

None.

BACKGROUND OF THE INVENTION

The concept of harnessing energy from moving water and the wind continues to be the source of research and innovation. The most common method used to harness energy from moving water involves building a hydroelectric dam and extracting energy by passing water through turbines. Building dams creates problems, including flooding of land, creating barriers to migrating fish and upsetting the natural high and low water flow cycles. Windmills are commonly used for harnessing wind energy. Windmills typically have a number of blades, wings or other fluid foils that rotate about a central, typically horizontally-oriented, drive shaft. Another type of energy-harnessing apparatus is a conveyor-type apparatus in which a number of fluid foils are carried by an endless chain passing between spaced-apart sprockets. Conveyer-type apparatus have been developed for use in both air and water. Some of these apparatus use flexible fabric as the fluid foils; see, for example, U.S. Pat. No. 443,641. Other conveyor-type apparatus use relatively rigid fluid foils; see U.S. Pat. Nos. 1,502,296; 4,049,300; and 4,563,168.

SUMMARY OF THE INVENTION

The present invention is directed to a conveyor-type fluid energy-harnessing apparatus in which reversible fluid foils permit energy to be extracted from the moving fluid, in particular wind, along the upstream reach and the downstream reach in a simple and effective manner.

A first example of apparatus for harnessing energy from wind comprises upper and lower continuous-loop trackways defining a continuous loop path. The apparatus also includes movable wind foils. Each wind foil has a leading edge mast engaging and guided by the upper and lower trackways. A mast connecting assembly connects the masts of a series of the wind foils to one another so that the series of wind foils can move along the path. Each wind foil is movable between a first orientation, when moving along a first portion of the path, and a second orientation, when moving along a second portion of the path. In some examples an electrical generator may be connected to and moved along with at least one of the masts and the mast connecting assembly so to harness energy from the wind. With some examples the mast connecting assembly is a continuous loop and includes a plurality of fixed length connectors between adjacent masts. Some examples may include means for changing the orientation of the support structure according to the direction of ambient wind.

A second example of apparatus for harnessing energy from wind comprises a support structure having upper and lower closed loop trackways defining a closed loop path. Each trackway comprises inner and outer trackway rails spaced apart from one another at a chosen separation. The apparatus also includes trolleys along the upper and lower trackways. Each trolley comprises a roller mounted to a roller support. The roller is positioned between, engageable with, movable along and guided by at least one of the inner and outer rails of the upper and lower trackways. The roller and the inner and outer trackway rails have opposed surfaces shaped to permit the roller to move freely along the trackway rails while supporting the trolley on the trackway rails. The assembly also includes a connector connecting adjacent trolleys of a series of the trolleys to one another to create a trolley train movable along each of the upper and lower trackways. Each connector comprises central and end portions. The end portions are rigidly secured to the roller supports of adjacent trolleys. The central portion is flexible in at least one plane and is positioned between the inner and outer trackway rails. The assembly further includes sail assemblies with each sail assembly having a mast, having upper and lower ends, and a sail extending from the mast. The upper and lower ends of the mast mounted to and supported by upper and lower trolleys. In some examples each sail is movable between a first orientation, when moving along a first portion of the path, and a second orientation, when moving along a second portion of the path. With some examples the sail assemblies are mounted to every other trolley of the series of trolleys along each of the upper and lower trolleys. Some examples include an electrical generator carried by at least one of the trolleys so to harness energy from the wind.

Other features and advantages of the invention will appear From the following description in which the preferred embodiments have been set forth in detail in conjunction with the accompanying drawings.

BRIEF DESCRIPTION OF THE DRAWINGS

FIG. 5 is a simplified enlarged view of one of the fluid foils along the upflow reach, the fluid foil being deflected into its asymmetrical fluid foil shaped by the current with the trailing end of the fluid foil being restrained by fluid foil sheeting;

FIG. 6 illustrates the fluid foil of FIG. 5 and generally straight, relaxed state when the fluid foil is not been deflected by a flowing fluid;

FIGS. 9 and 10 are views similar to FIGS. 5 and 6 of the alternative fluid foils of FIG. 8;

FIG. 12A is a partial view taken along line 12A-12A of FIG. 12;

FIGS. 26-33 disclose a second example of apparatus for harvesting energy from the wind.

DESCRIPTION OF THE SPECIFIC EMBODIMENTS

Figure 1:
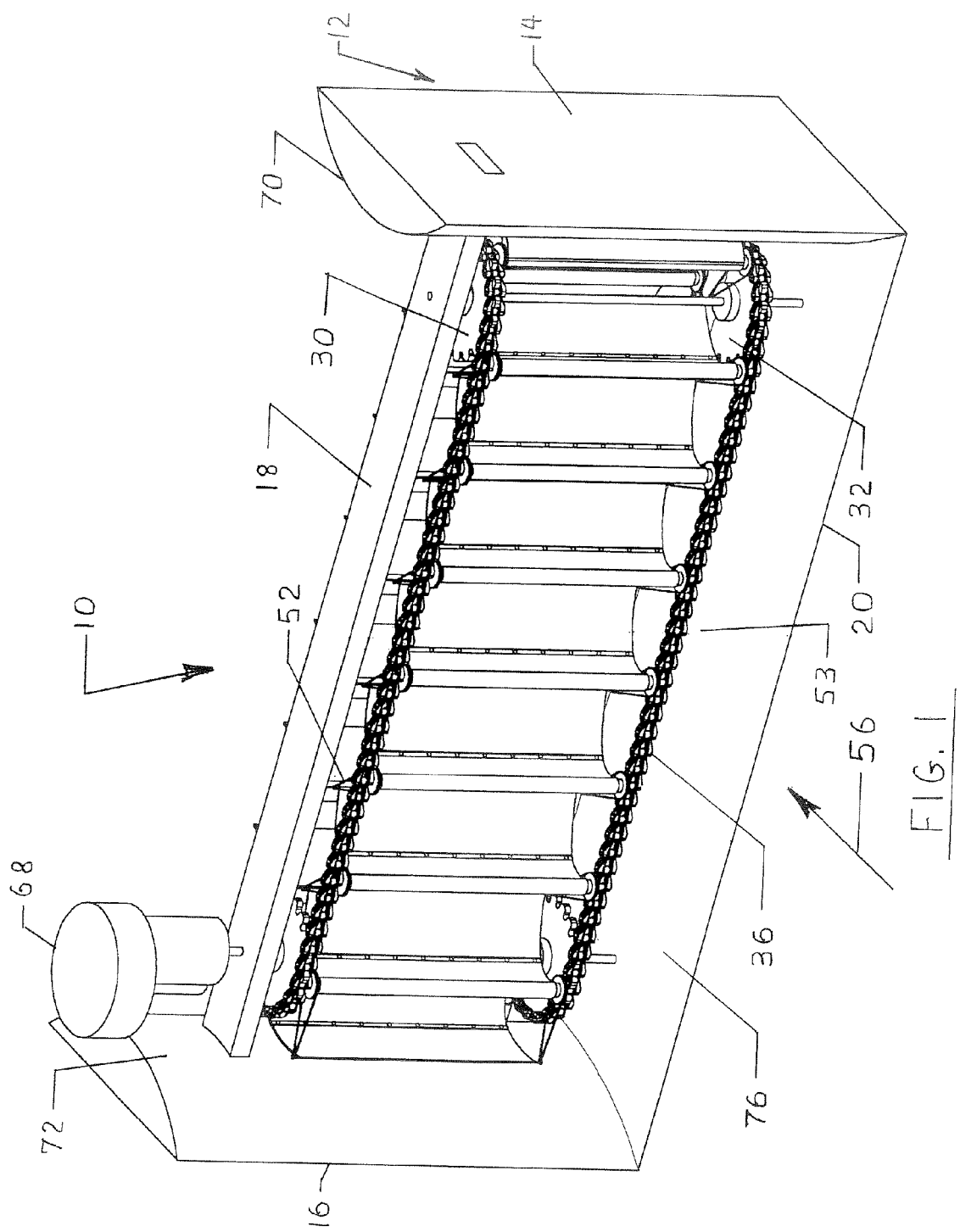
FIG. 1 is an isometric view of an example of a conveyor-type fluid energy-harnessing apparatus.
Figure 2:
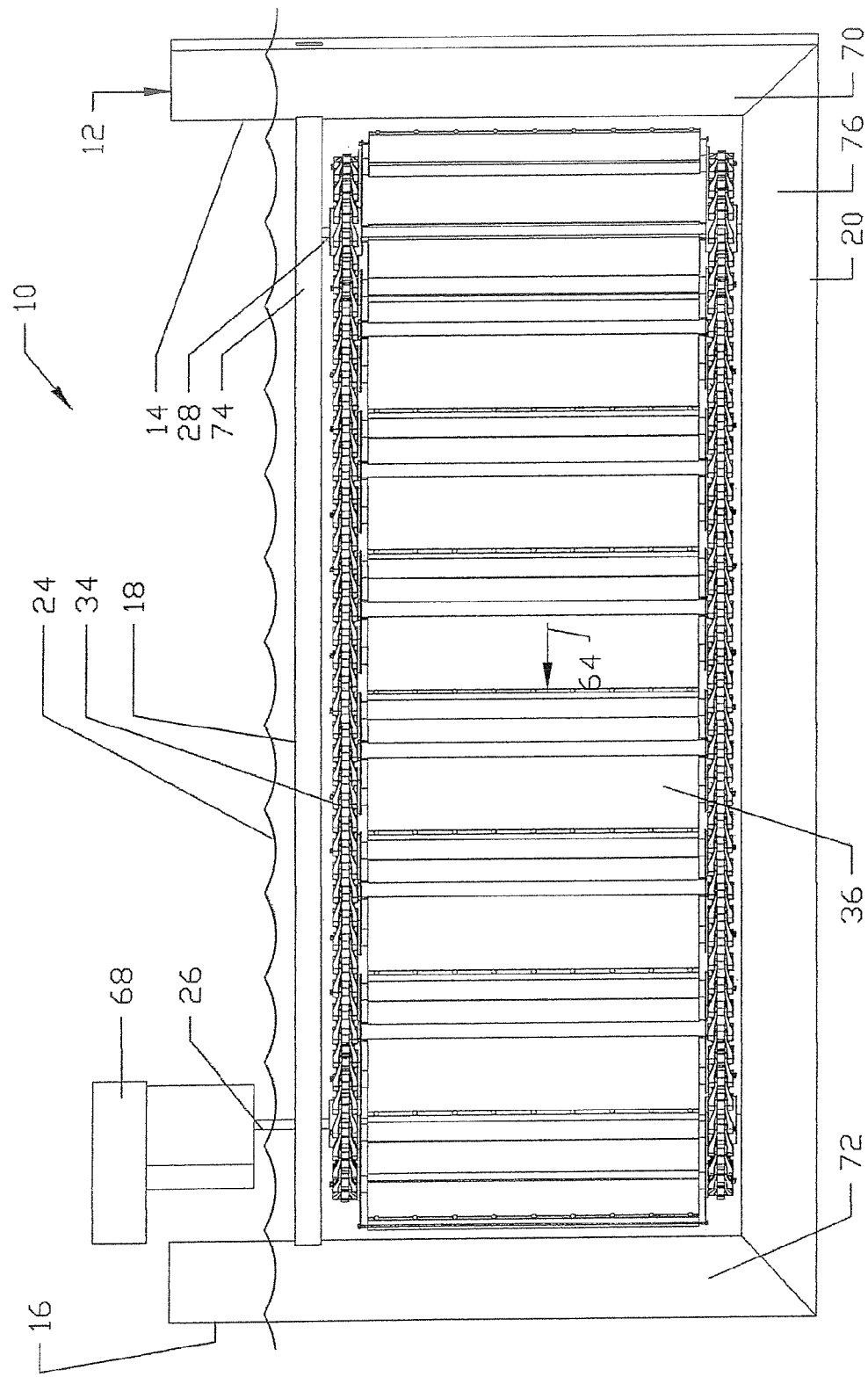
FIG. 2 is a side view of the apparatus of FIG. 1 shown resting on the bottom of a river.

The following description of the invention will typically be with reference to specific structural embodiments and methods. It is to be understood that there is no intention to limit the invention to the specifically disclosed embodiments and methods but that the invention may be practiced using other features, elements, methods and embodiments. Preferred embodiments are described to illustrate the present invention, not to limit its scope, which is defined by the claims. Those of ordinary skill in the art will recognize a variety of equivalent variations on the description that follows. Like elements in various embodiments are commonly referred to with like reference numerals.

Referring first to FIGS. 1-4, a conveyor-type fluid energy-harnessing apparatus 10 is shown. Apparatus 10 is constructed for use in waterways, such as in rivers and tidal flow areas. Apparatus made according to the invention can also be constructed to harness energy from other moving water. However, apparatus made according to the invention may also be constructed for harnessing wind energy as well as energy from moving water.

Figure 3:
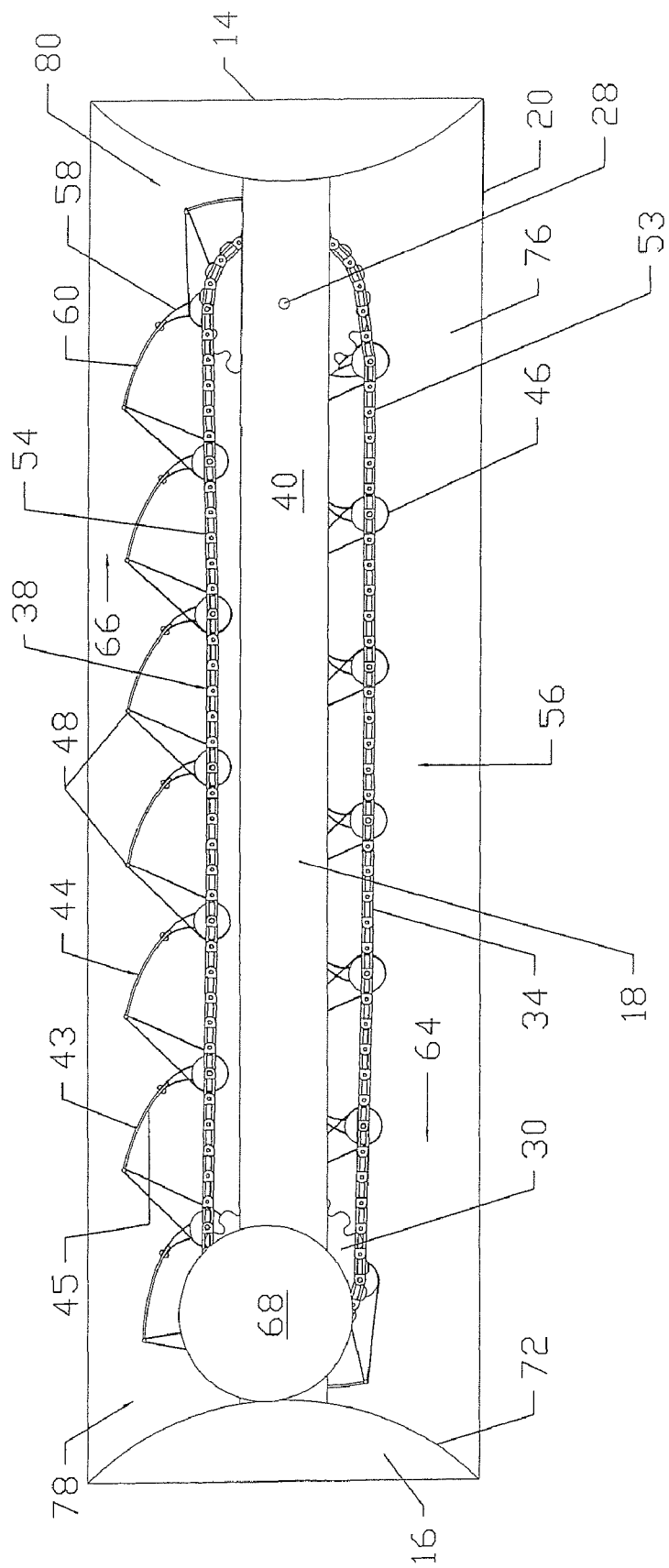
FIG. 3 is a schematic plan view of the apparatus of FIG. 1.
Figure 3A:
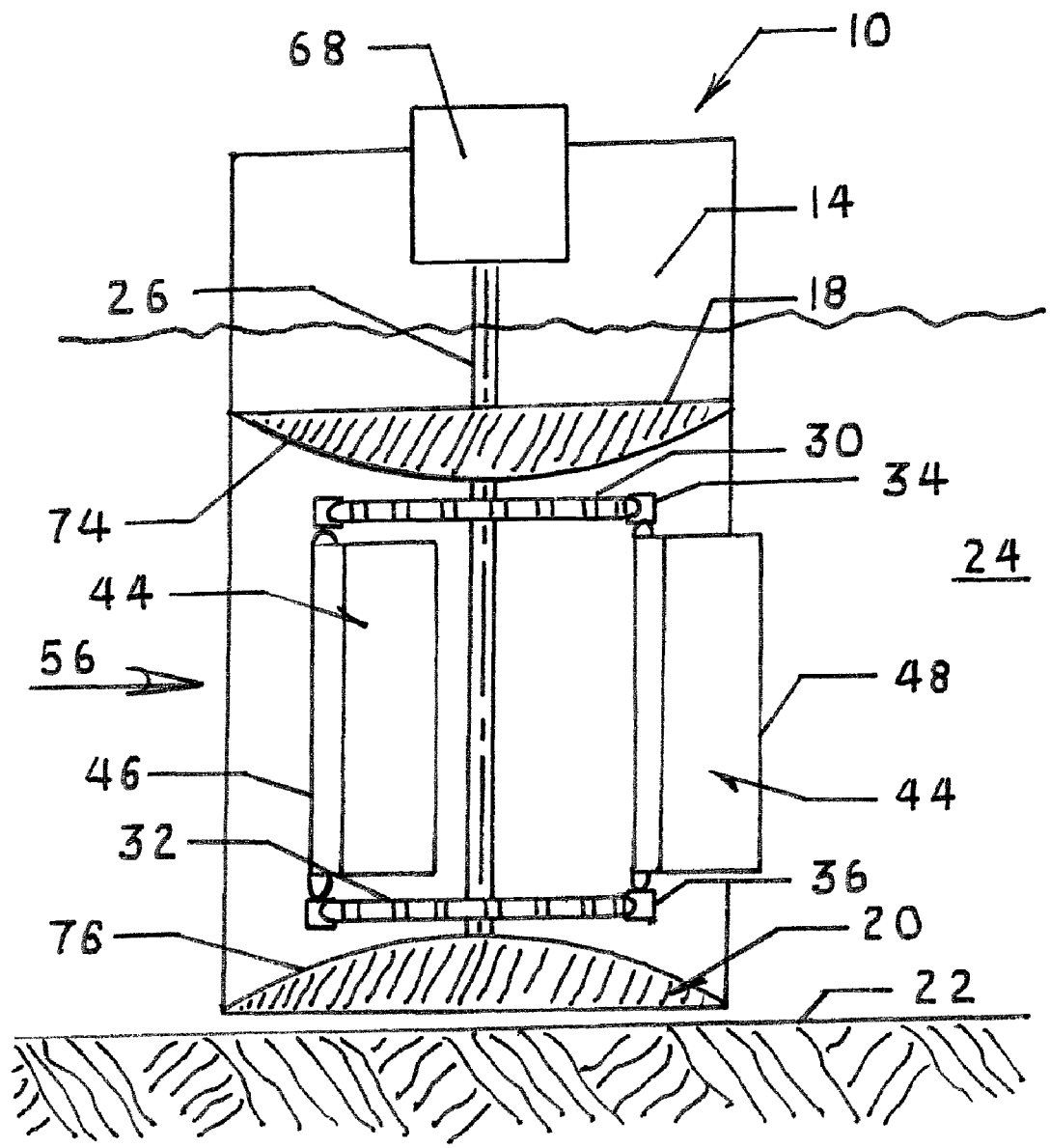
FIG. 3A is a simplified schematic cross-sectional view of the apparatus of FIG. 3.
Figure 4:
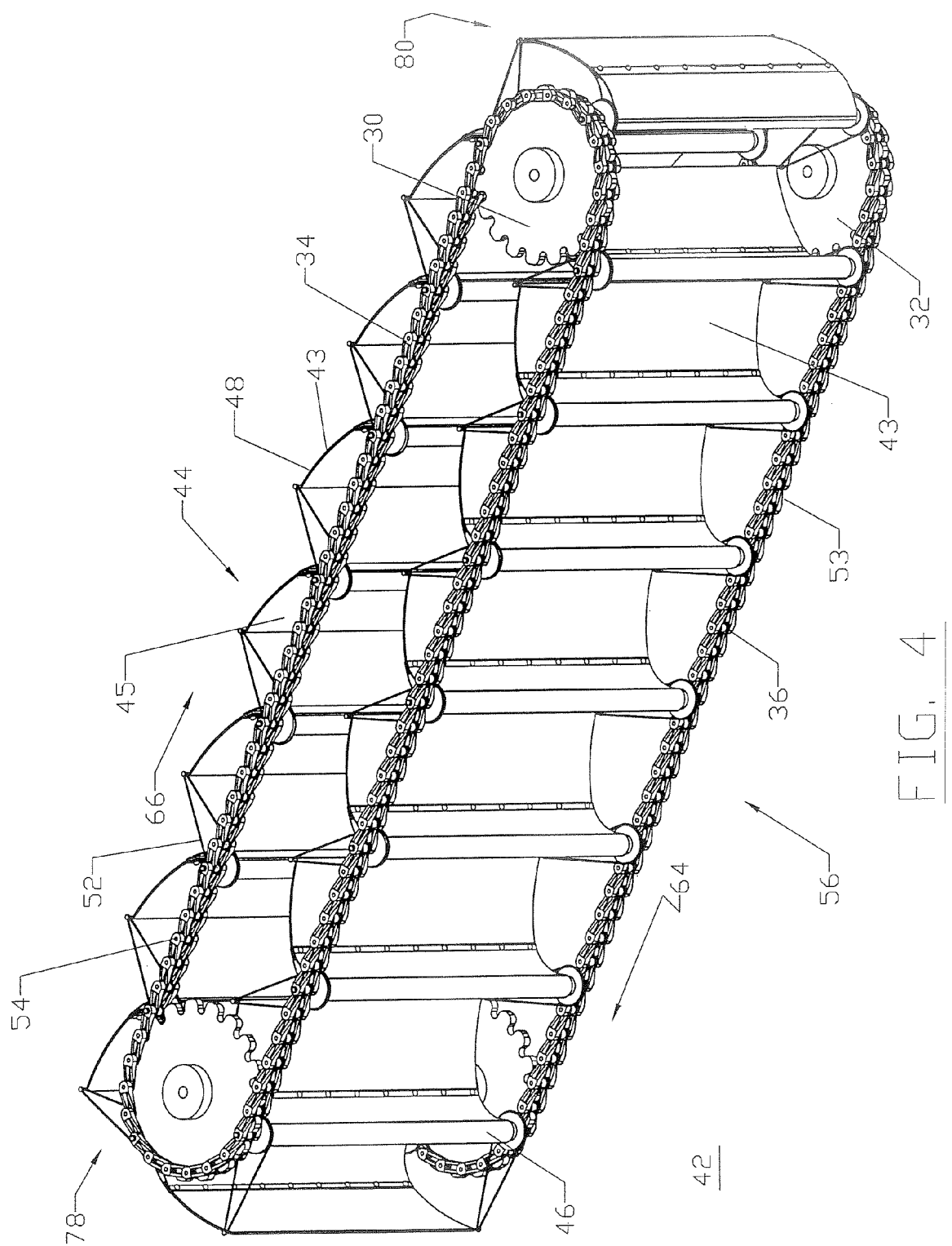
FIG. 4 is an isometric view of the chains and fluid foils of FIG. 1.
Figure 7A:
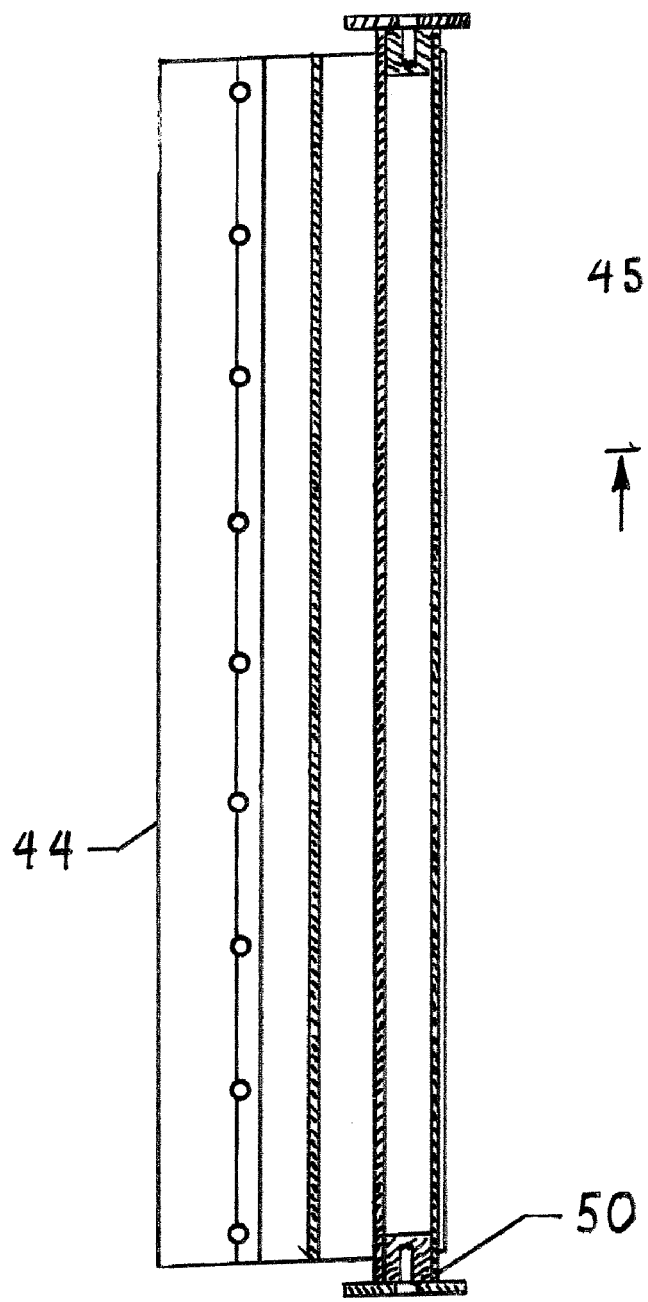
FIG. 7A is a cross-sectional view taken along the line 7A-7A of FIG. 7.

Apparatus 10 comprises a support structure or frame 12 having end members 14, 16 an upper transverse member 18 and a lower transverse member 20. Lower transverse member 20 rests on the bottom 22 (see FIG. 3A) of the river 24 or other waterway. A pair of shafts 26, 28 extends between upper and lower transverse members 18, 20 near end members 14, 16. Each shaft 26, 28 supports an upper sprocket 30 and a lower sprocket 32. Continuous loop upper and lower chains 34, 36 extend around and engage upper and lower sprocket 30, 32. Chains 34, 36 define a closed loop path 38, the path defining an interior region 40 (see FIG. 3) and an exterior region 42 (see FIG. 4). A series of sail-like reversible fluid foils 44 are secured to and mounted between upper and lower chains 34, 36. Foils 44 have first sides 43 and second sides 45. As shown best in FIGS. 3-7, each fluid foil comprises a leading end 46 and a trailing end 48. The enlarged leading end 46 of fluid foil 44 is secured to and between outer and inner chains 34, 36 by a pivot shaft assembly 50, see FIG. 7A, to permit the fluid foil to freely pivot about its leading end 46. Trailing end 48 of fluid foil 44 is connected to flexible fluid foil sheeting 52. Sheeting 52 limits the movement of foil 44 to a first orientation, shown in FIGS. 3-5, within interior region 40 as fluid foil 44 passes along an upflow reach 53 of chains 34, 36. Sheeting 52 also limits the movement of foil 44 to a second orientation, shown in FIGS. 3 and 4, within the exterior region 42 as fluid foil 44 passes along a downflow reach 54 of chains 34, 36. The identification of upflow and downflow reaches 53, 54 is based upon the direction of the fluid flow, indicated by flow direction arrow 56. As will be discussed below, one of the advantages of apparatus 10 is that the apparatus can be used in, for example, tidal flow regions where flow direction 56 reverses without changing the position of the apparatus.

Figure 7:
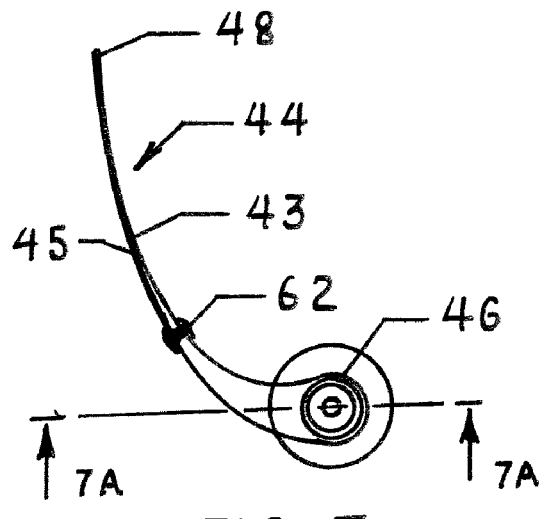
FIG. 7 is a top or end view of one of the fluid foils of FIG. 4.

In the embodiment illustrated in FIGS. 5-7, fluid foil 44 comprises a leading portion 58 and a trailing portion 60. In one embodiment, leading portion 58 is made from a thermosetting plastic sheet heat formed into the general shape illustrated in FIG. 6. Trailing portion 60, in this embodiment, comprises a plywood body encased in fiberglass and secured to leading portion 58 by rivets 62. Under the influence of the water current, indicated by flow direction arrow 56, foil 44 moves from its generally straight, relaxed state of FIG. 6 to the asymmetrical fluid foil shape of FIG. 5 causing chains 34, 36 to move in the direction of arrows 64, 66 because of the differential in pressure between the upstream and the downstream sides of foil 44. In this embodiment fluid foil sheeting 52 is a rope, line or other flexible member. The distance trailing end 48 can move on either side of closed loop path 38 can be adjusted by, for example, changing the length of sheeting 52 and/or limiting how far leading end 46 of fluid foil 44 can pivot in either direction. The optimal shape for fluid foil 44 may vary depending upon operating conditions. Therefore, fluid foil 44 may be made to allow the user to adjust its flexibility by, for example, making the position of rivets 62 adjustable or adding or subtracting stiffening elements along fluid foil 44. Fluid foil 44 may be constructed to cause the fluid foil to automatically adjust its angular orientation and/or shape according to flow condition, and so doing could eliminate the need for sheeting.

Upper and lower sprockets 30, 32 are keyed to drive shaft 26 so that movement of upper and lower chains 34, 36 along closed loop path 38 causes drive shaft 26 to rotate therefore driving an electrical generator 68 connected to drive shaft 26 and mounted to frame 12. Instead of generator 68, drive shaft 26 could be connected to a pump or other device that can use the energy from drive shaft 26. Frame members 14-20 have fluid-channeling surfaces 70, 72, 74 and 76 to help direct fluid flow towards upflow reach 53 and thus towards foils 44 along both upflow reach 53 and downflow reach 54.

In use, apparatus 10 is placed at a suitable position on the bottom 22 of a waterway, typically a river 24, in which flow direction 56 remains the same, or a flow-reversing region, such as a tidal flow area, in which flow direction 56 periodically reverses itself. The depth of water at the site need only be, for example, about three feet (1 m) deep. Greater depths are, of course, suitable. If the depth is too great, apparatus 10 may be supported on poles or pilings or suspended from pontoons or other flotation devices. Is preferred that upper transverse member 18 be positioned below the surface of the water so that floating debris tends to pass over the device. The water flow in flow direction 56, see FIGS. 1, 3 and 4, cause fluid foils 44 to assume the first orientation along upflow reach 53, with first sides 43 concave and second sides 45 convex, and the second orientation along downflow reach 54, with first sides 43 convex and second sides 45 concave. The fluid flow causes foils 44 to drive chains 34, 36 along closed loop path 38 in the direction of arrows 64, 66. When fluid foils 44 reach the end of upflow reach 53, they stop driving chains 34, 36 and naturally begin a jibing sequence 78 (see FIG. 3) similar to that occurring to a sailboat sail. During this jibing sequence foils 44 move from the first orientation in interior region 40 to the second orientation in exterior region 42. They then move in the direction of arrow 66 along downflow reach 54 driving chains 34, 36 along path 38. When fluid foils 44 reach the end of downflow reach 54, they stop driving chains 36, 38 and naturally begin a tacking sequence 80 similar to that occurring to a sailboat sail, moving from exterior region 42 to interior region 40 and again begin the chain-driving movement along upflow reach 54. Assuming the waterway is in a region where flow direction 56 reverses, such as a tidal region, the designations of the upflow reach and the downflow reach reverse. However, due to the construction of apparatus 10, chains 34, 36 continue to be driven in the same direction along closed loop path 38.

Figure 8:
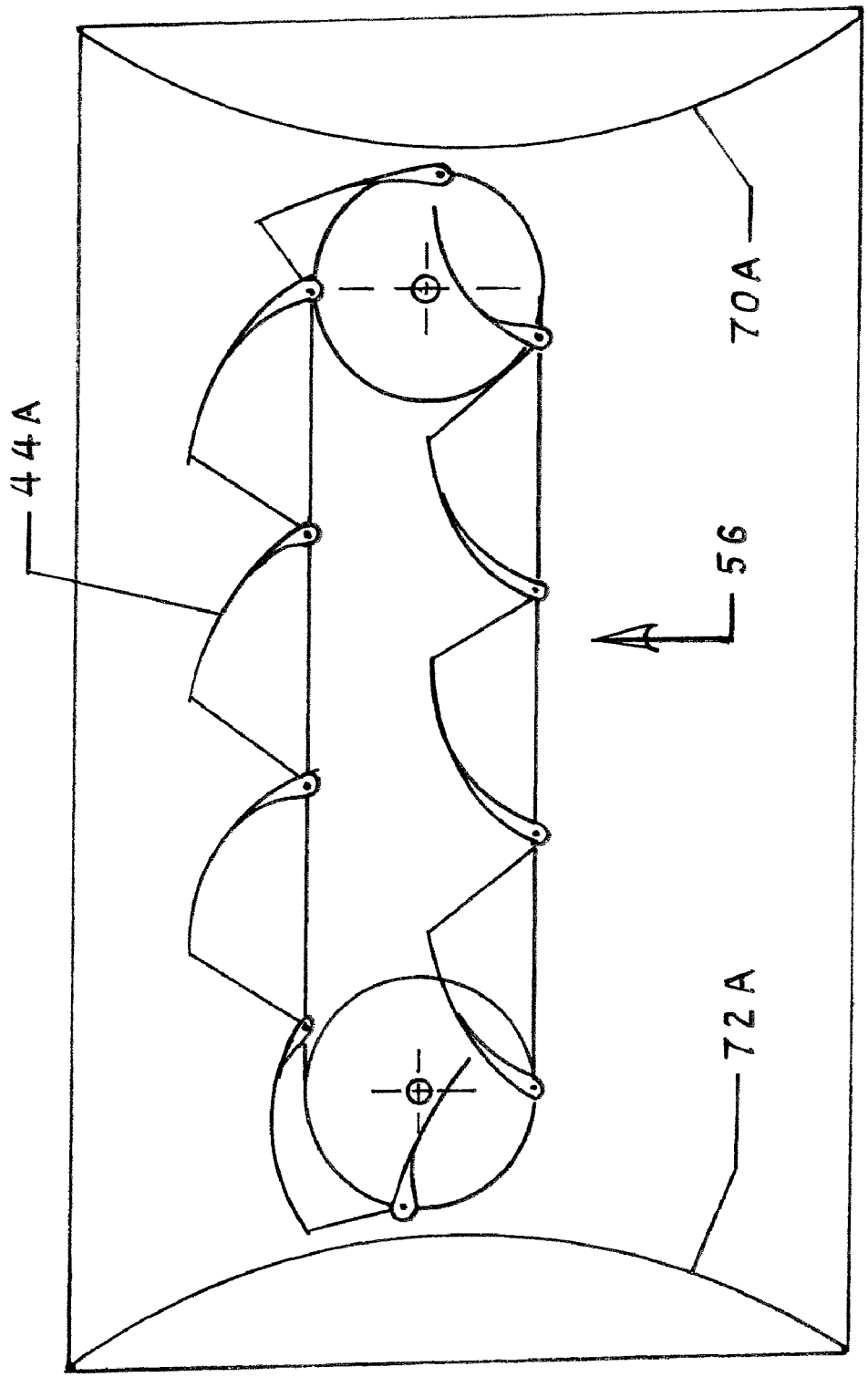
FIG. 8 is an illustration similar to that of FIG. 3 of an alternative embodiment of the invention.

FIGS. 8, 9 and 10 illustrate an alternative embodiment of the invention with like reference numerals referring to like elements. Fluid-channeling surfaces 70A and 72A are shaped somewhat differently to accommodate the somewhat slightly different movement of foils 44A. Instead of being securely clamped to leading portion 58A, a curved member 86 of leading portion 58 passes through an opening in trailing portion 60A so that the trailing portion essentially pivots about a distal opening 84 formed in leading portion 58A.

Modification and variation can be made to the embodiments of FIGS. 1-10 without departing from the subject of the invention as defined in the following claims. For example, it may be possible to construct fluid foil 44 so that the cross-sectional shape of fluid foil 44 changes according to the pivotal orientation of the fluid foil. Frame 12 could be mounted to pivot about a vertical axis to remain aligned with flow direction 56; this pivotal movement could be limited to small angles, such as 10°-30°, to accommodate small changes in fluid flow direction 56 or it could permit essentially unrestricted pivotal movement to accommodate complete (about 180°) reversal of fluid flow direction 56 in, for example, tidal flow areas. Fluid foil 44 could be constructed from a variety of materials, including metal, polymers, composites, fabrics, etc., and may be made as a single, typically molded, element or from a number of elements rigidly and/or movably secured to one another.

First Wind Machine Embodiment

This aspect of the invention is described with reference to FIGS. 11-25 and is directed to a first example of an apparatus 10 that harnesses energy from the wind.

Basic Structure

Figure 11:
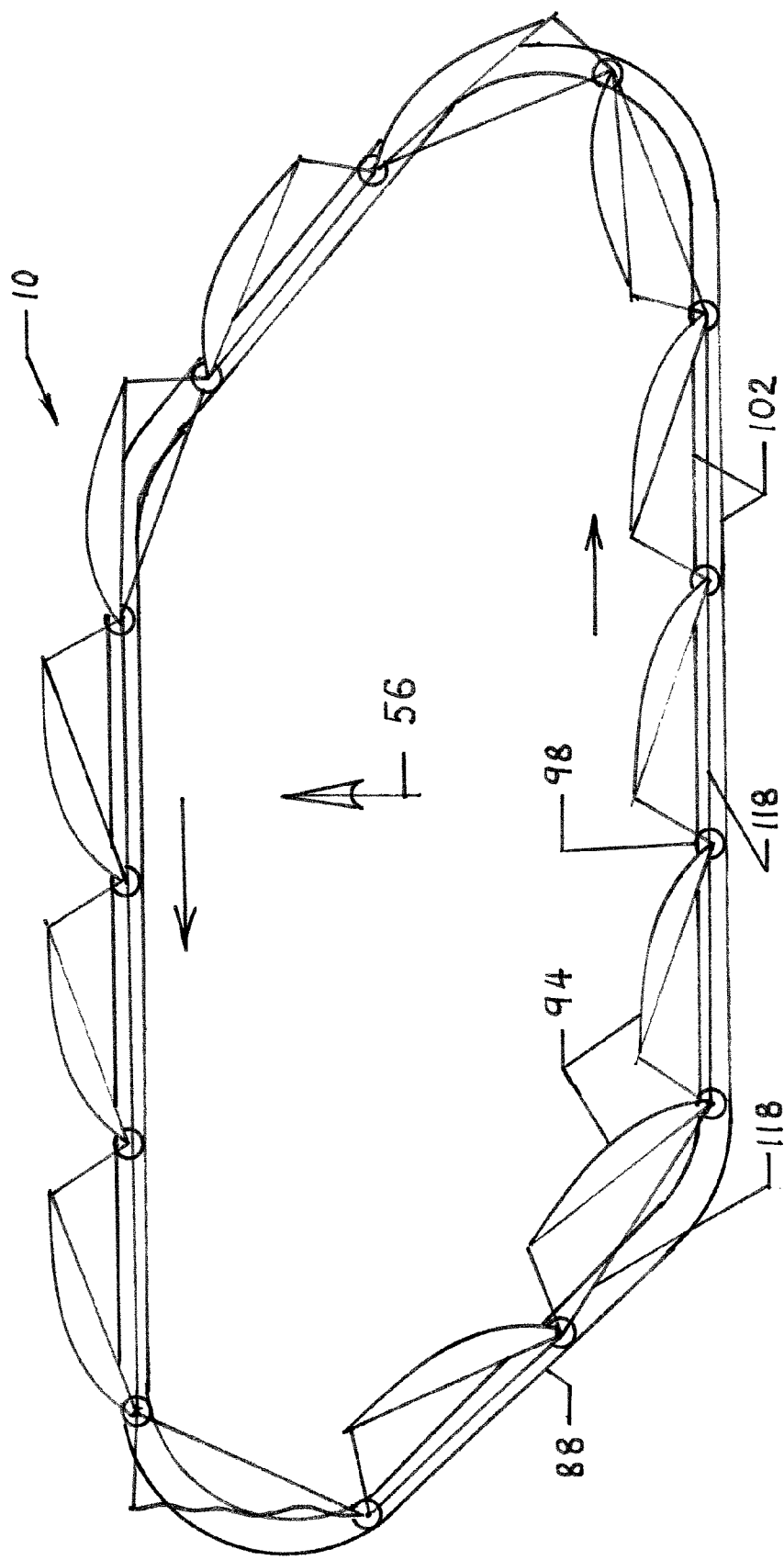
FIG. 11 is a plan view of a machine or apparatus for harvesting wind.
Figure 12:
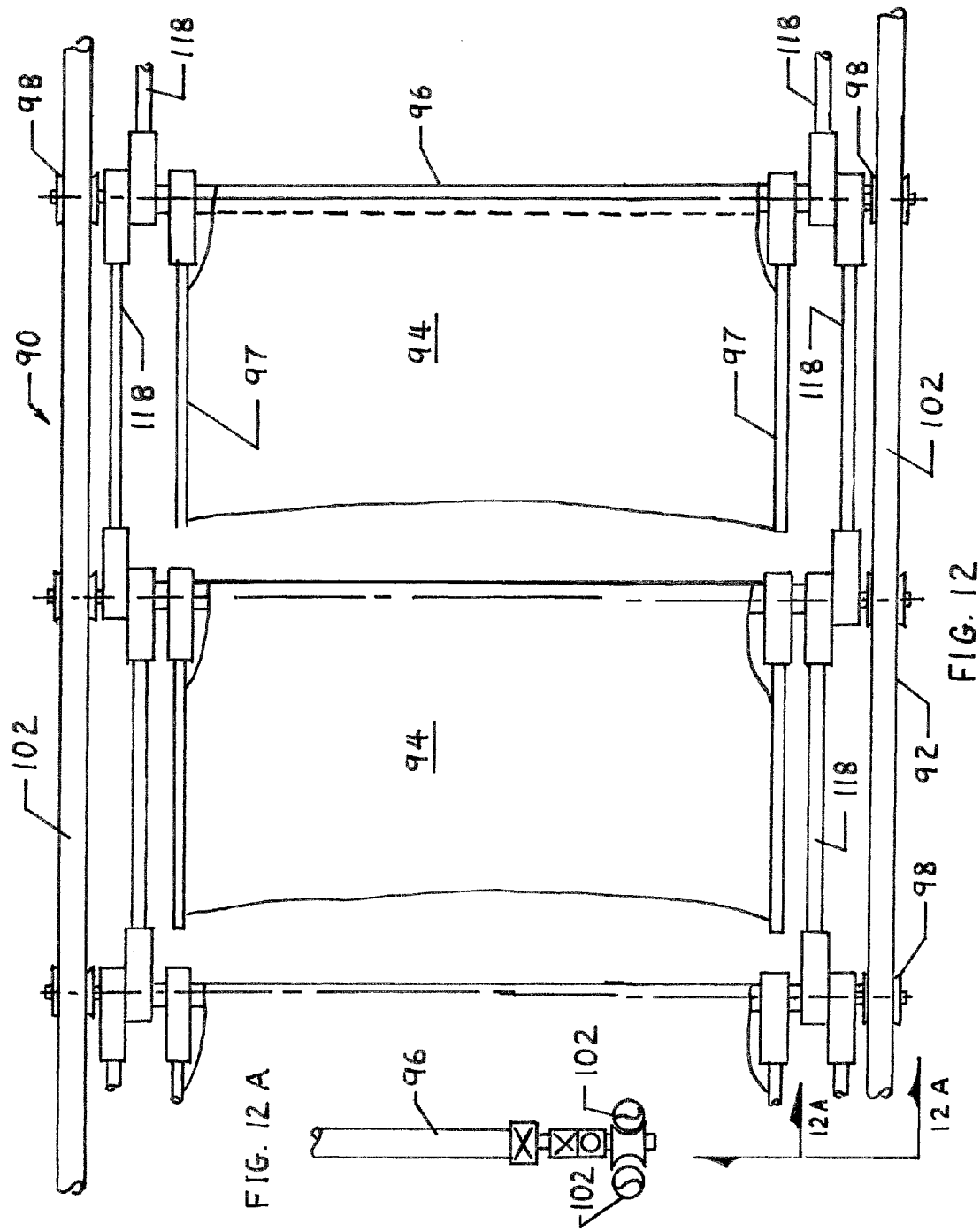
FIG. 12 is a side view of a portion of the apparatus of FIG. 11.

This apparatus is comprises a support structure 88, see FIGS. 11 and 12, that supports upper and lower closed loop guide track ways 90, 92.

The upper and lower horizontal track ways 90, 92 support a series of fluid foils in the form of sails 94, each sail 94 extending from a sail mast 96 with the aid of upper and lower booms 97. Each sail mast 96 is fitted with rollers 98 which are held captive in the upper and lower closed loop track ways 90, 92 that allow the rollers to move in a horizontal fashion along a closed loop path defined by the upper and lower closed loop track ways.

Figure 13:
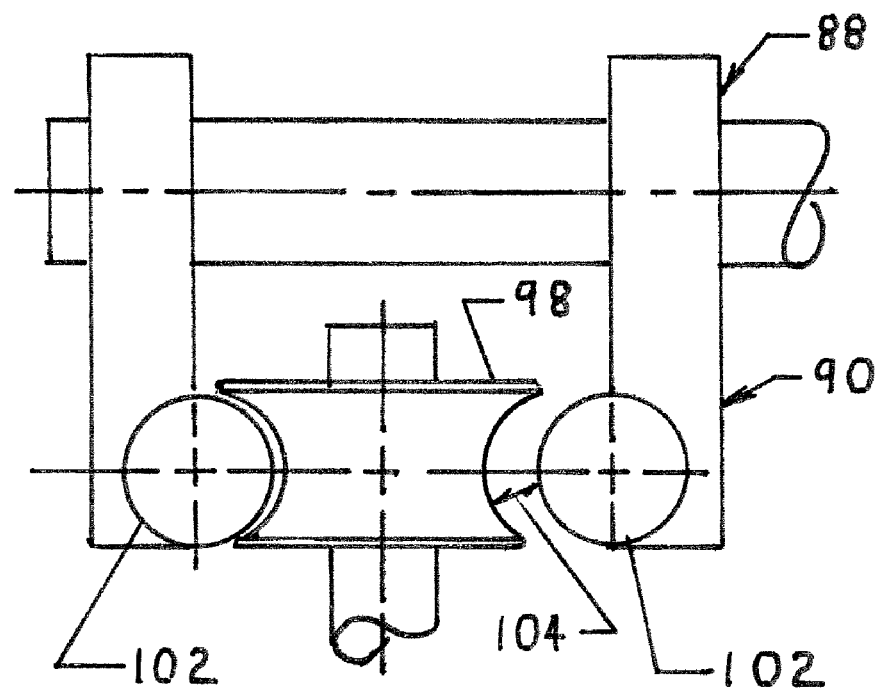
FIG. 13 is an enlarged simplified cross-sectional view of the upper track way of FIG. 12.
Figure 14:
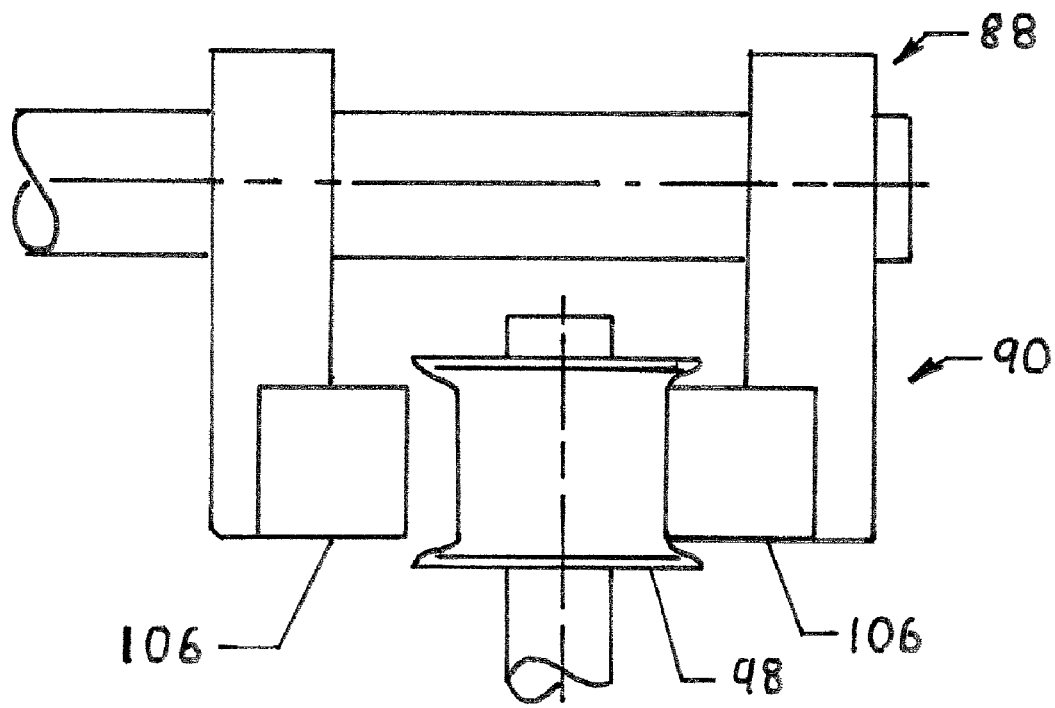
FIGS. 14-16 are views similar of other examples of the track way of FIG. 13.
Figure 15:
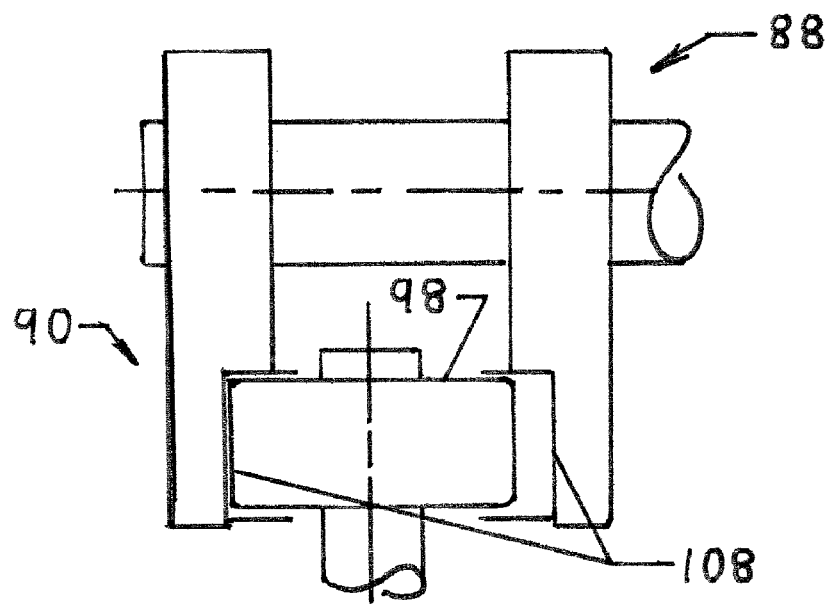
Figure 16:
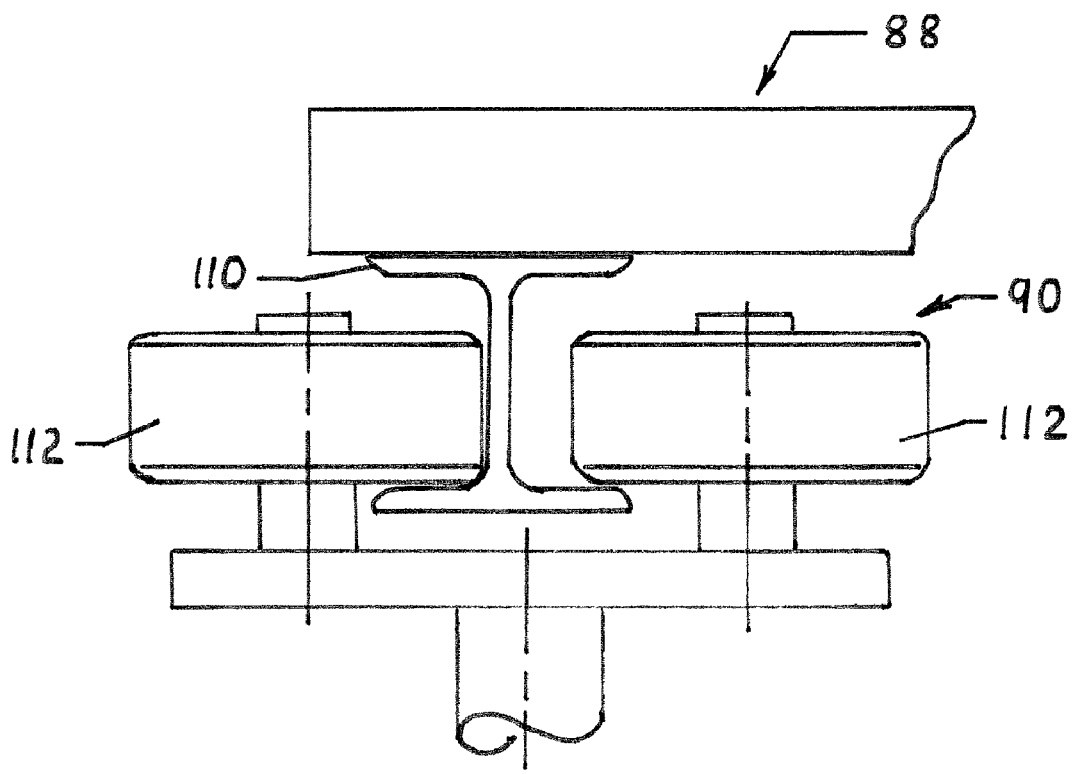

FIG. 13 is a simplified cross-sectional view of the upper track way 90 illustrated in FIGS. 11 and 12. The distance between the round tubing 102 of the upper track way is sized so that and the roller 98 rides against one of the round tubing as it moves along the closed loop path. Tubing 102, also called track way tubing 102, acts as track way rails 102. However, the gap 104 is sufficiently small and the roller 98 is sized and configured so that the roller will not inadvertently become dislodged from between the opposed track way tubing 102. FIGS. 14-16 illustrate alternative embodiments of the structure of FIG. 13. FIG. 14 illustrates the use of square tubing 106 instead of round tubing and appropriately shaped rollers 98 to properly engage the square tubing. FIG. 15 illustrates an embodiment in which channel sections 108 are used instead of the round tubing 102 of FIG. 13 with the roller 98 being a cylindrical roller captured between the channel sections. The FIG. 16 embodiment replaces the round tubing 102 of FIG. 13 with an I beam section 110 and uses a pair of rollers 112 to engage the vertical web of the I beam.

Figure 17:
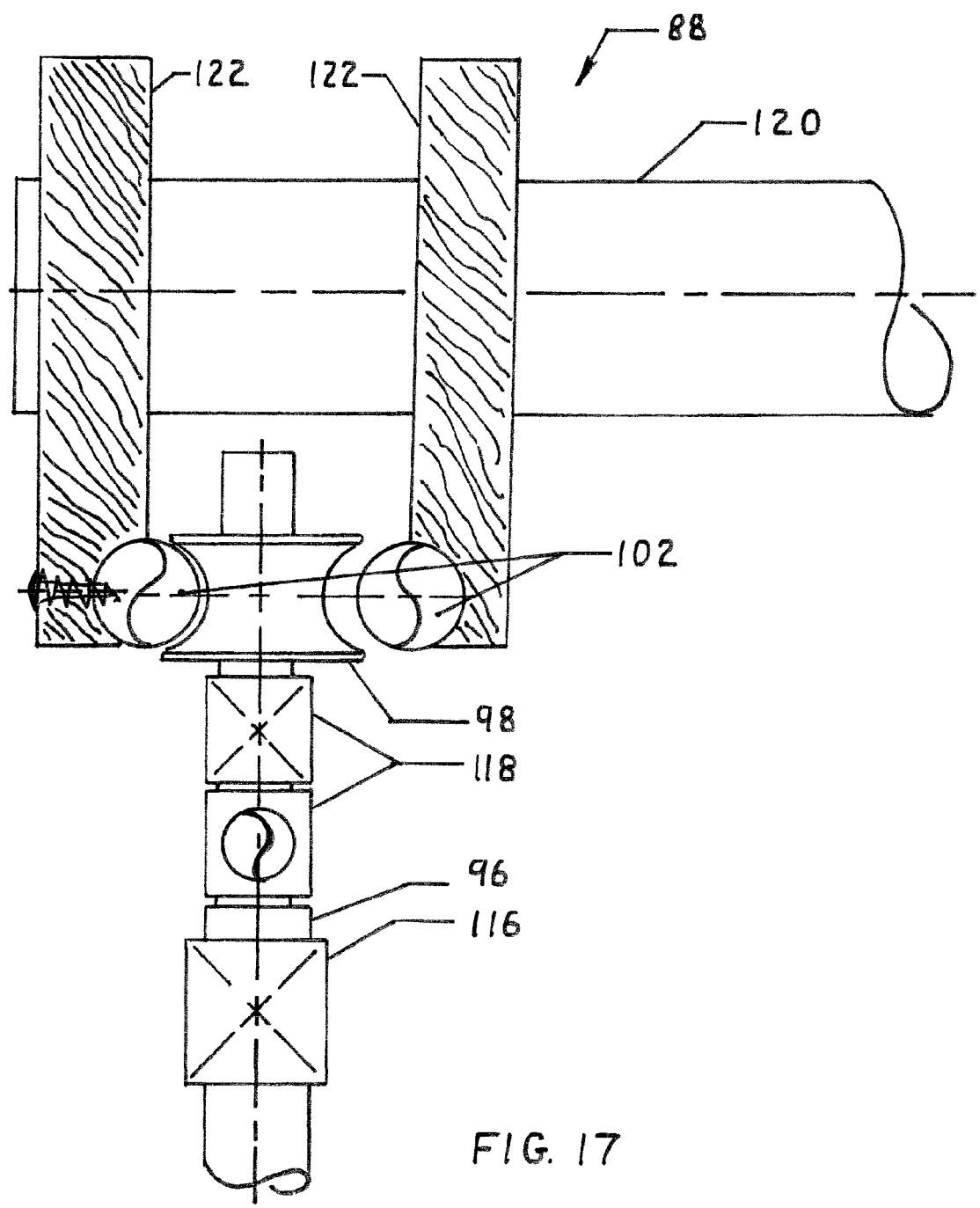
FIGS. 17 and 18 are enlarged, simplified cross-sectional views showing the various components of the structure of FIGS. 11-13.
Figure 18:
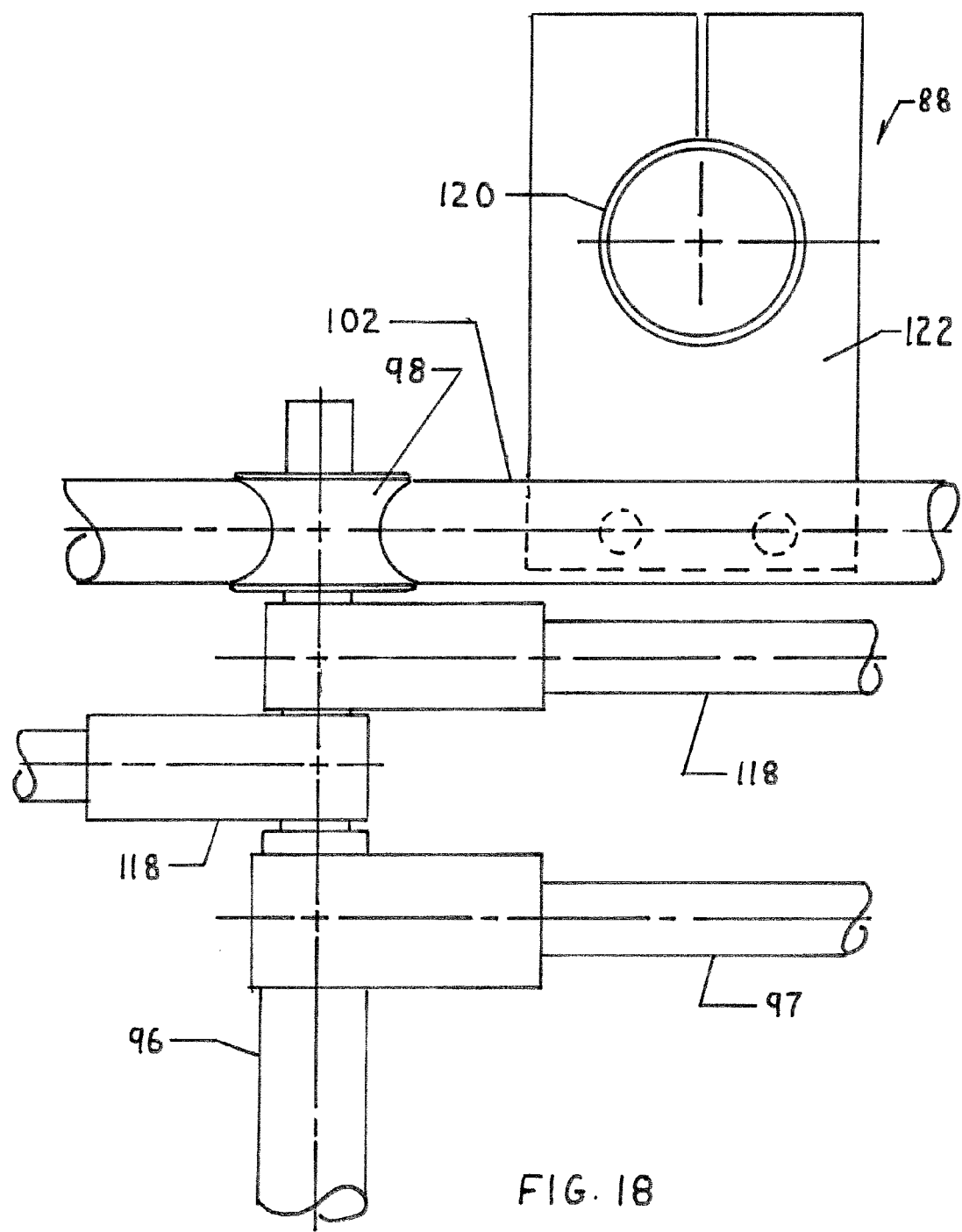
Figure 19:
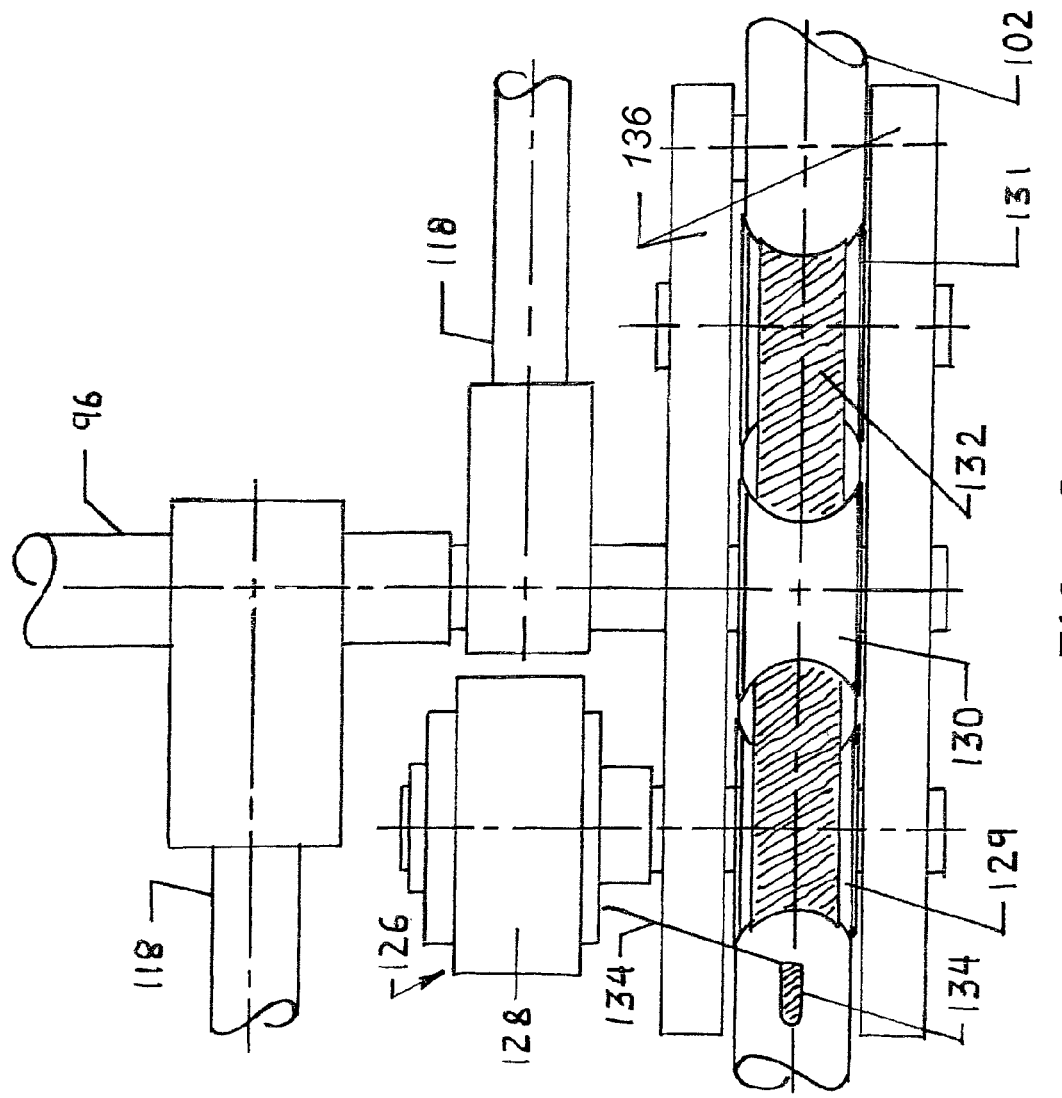
FIGS. 19-22 are different views of a generator truck engaging track way tubing.
Figure 20:
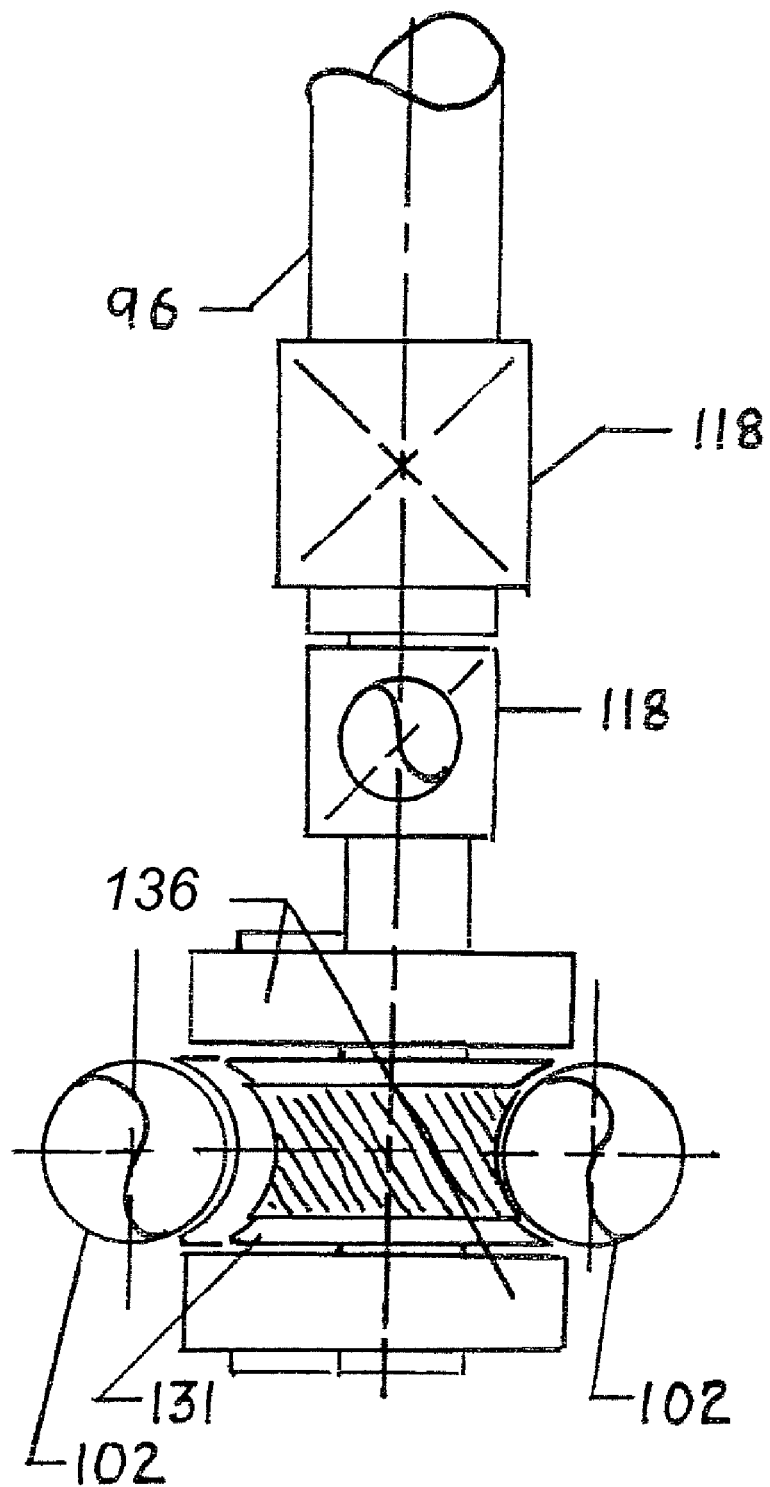
Figure 21:
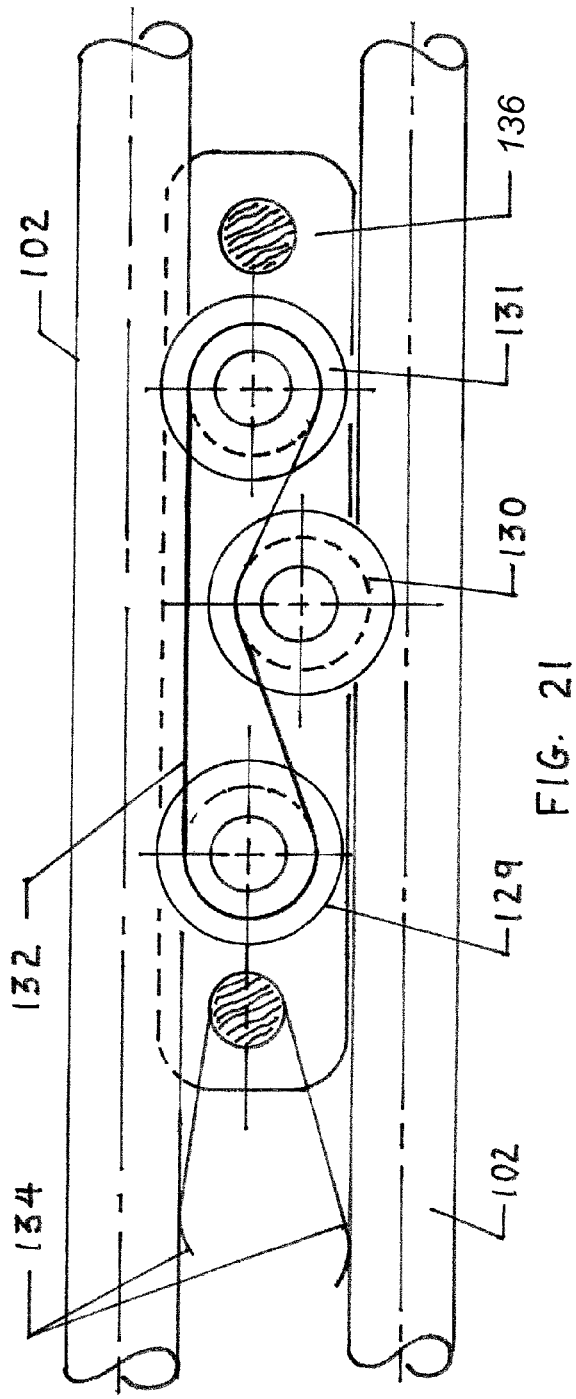
Figure 22:
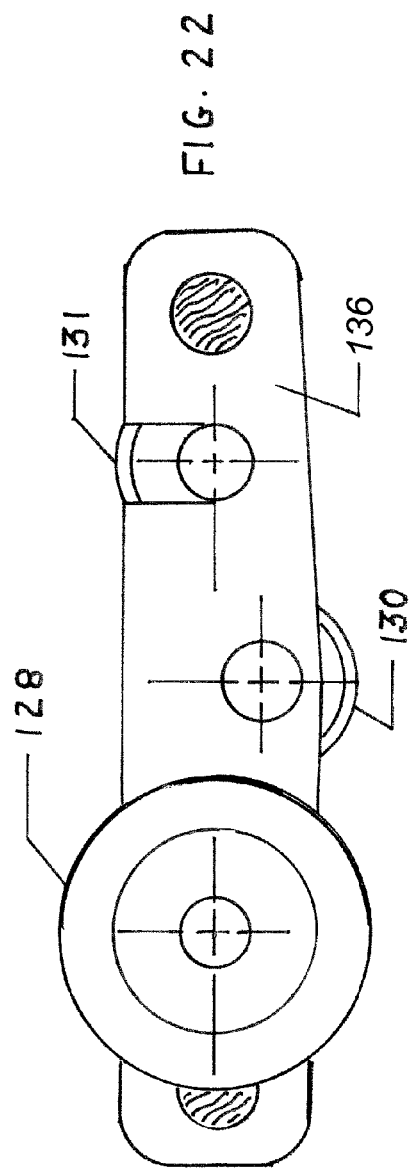

In this fashion the sails 94 are able to move in a loop along the closed loop tracks. All sails 94 are preferably connected to each other by tubing or other mast connectors 114 that keep the sails at a preset distance from each other. In this fashion a whole series of sails 94 can be connected to each other to make up a train of sails around the closed loop track. FIGS. 17 and 18 are enlarged, simplified cross-sectional and elevational views showing the various components between the mast 96 and the support structure 88, including the mast boom 116, mast connectors 118, mast roller 98 and round tubing 102 defining track ways 90, 92, for the embodiment of FIGS. 11-13. Support structure 88 includes a support tube 120, following track ways 90, 92, and track way tubing supports 122. In some situations it may be desirable to allow a certain amount of extension and/or contraction of one or more mast connectors 114 to help smooth the movement of the sails along the closed loop path. For example, a fixed length mast connector may have a nominal length but by exerting tension or compression forces on the mast connector, the mast connector may extend or contract, within limits, by expanding or compressing one or more springs.

One of the advantages of using mast connectors 118 instead of chains or other flexible connectors, such as used in the embodiments of FIGS. 1-10, is that the simple mast connectors are typically less prone to problems and failure in the field under use conditions. This is especially true when the apparatus is used to harvest wind energy and extends over considerable distances, such as 100 feet to 5 miles or more, and when the terrain is not completely flat, as is to be expected.

Electricity Generation

This series of sails 94 can then pull one or more generator trucks 126, see FIGS. 19-22, along the upper and/or lower track way 90, 92 which will then produce electricity using the latent energy of the wind as the wind moves the sails around the track. The generator 128 is coupled to rollers 129, 130, 131 connected to each other by a flat belt 132 (to get enough traction on the track way tubing 102) thereby inducing the generator armature to spin and thereby producing electricity. In one embodiment, each truck 126 will have a series of brushes 134 that will transmit the electricity to the track way tubing 102. One track way tubing 102 will be charged positively and the other track way tubing 102 will be charged negatively, similar to the system used by electric trains. This DC electricity can then be fed through an inverter in order to produce AC voltage. Other types of electricity generating mechanisms and machines, such as AC generators, may also be used. The electricity derived from the track way has then to be further modulated in order to be useable as AC grid line current. This can be done in a variety of ways depending on application.

The electric generator truck 126 is moved along the upper and/or lower track way 90, 92 by one or more sails 94. The generator truck 126 is made up of upper and lower cheek plates 136. The cheek plates 136 hold rollers 129-131 and a flat belt 132 between them. The two traction rollers 129, 130 are connected by flat belt 132 and tensioned by idler/tensioning roller 131. The tensioning roller 131 pushes the belt 132 between the two traction rollers 129, 131, thereby tensioning the rollers and the flat belt. The whole assembly of rollers 129-131 and belt 132 is tensioned and held captive between both track way tubes 102 that make up the upper or lower track way 90, 92.

Wind Alignment and Angle of Incidence

Proper sail to wind orientation (angle of incidence) is essential to start the sails 94 to move and to derive energy from the apparatus 10 and its sails. Adjusting the angle of incidence of the sails to the wind, commonly referred to as sheeting, can be preset manually or it can be done automatically with, for example, an electro-mechanical servo. Movable machines 140, described below with reference to FIG. 23, can use sails that are either preset manually or are automatically set. However, stationary machines 142 using, for example, fixed pylons 143 as components of support structure 88, see FIG. 24, may require automatic sheeting to operate efficiently.

Manually Preset Angle of Incidence Method

Figure 23:
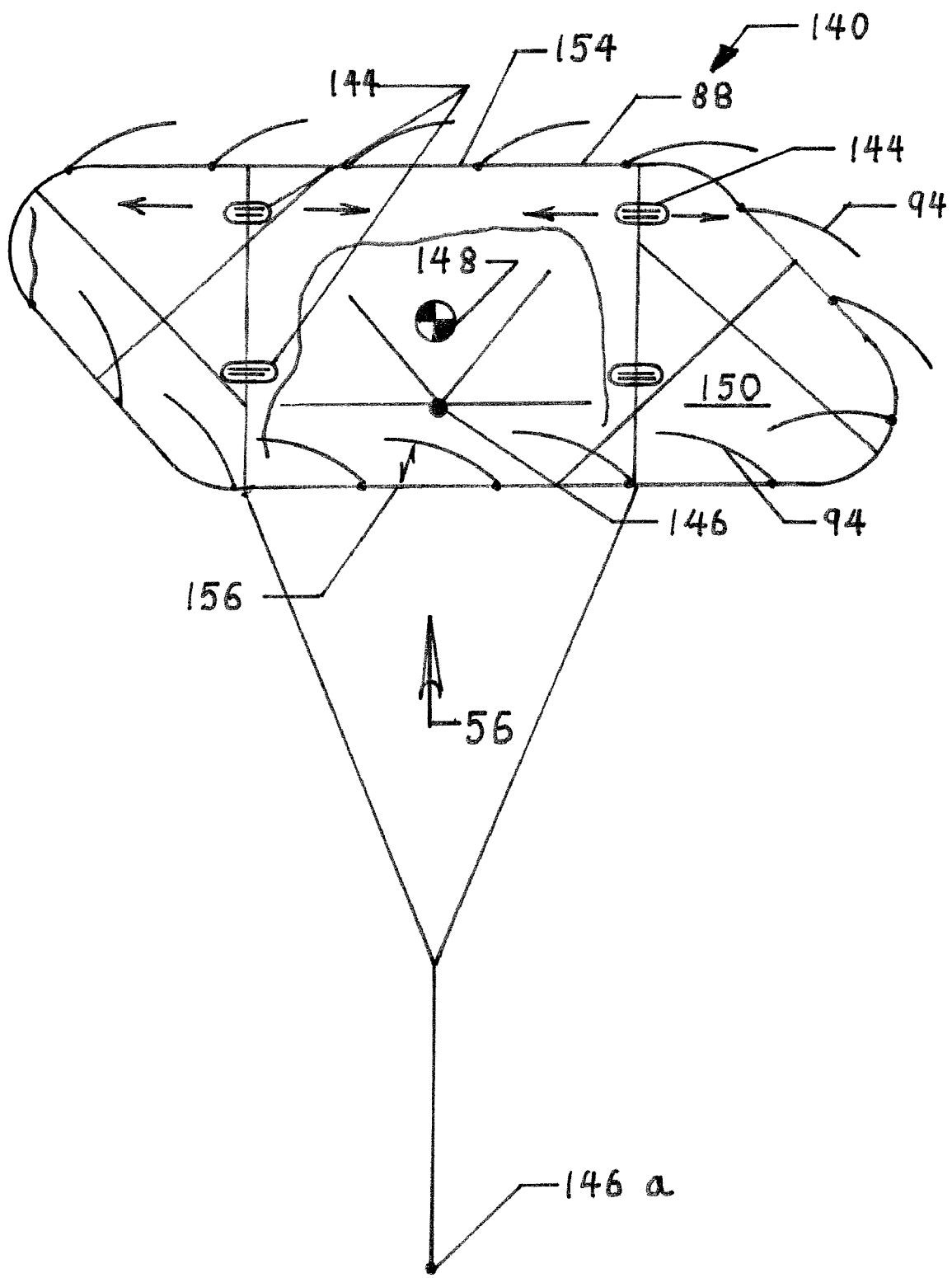
FIG. 23 is a schematic plan view of a movable machine with a pivot/anchor point external of the support structure or within the footprint of the support structure.
Figure 24:
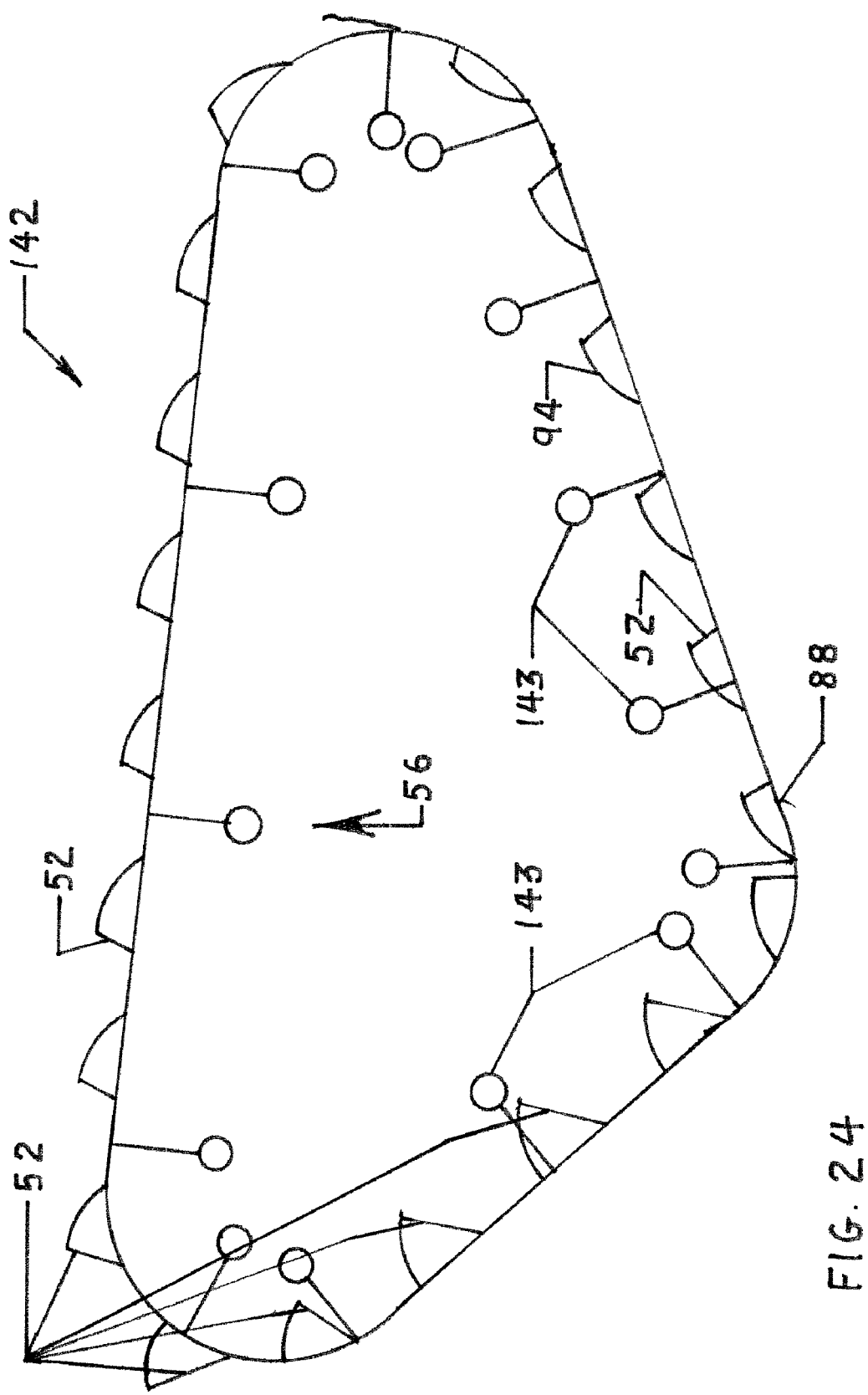
FIG. 24 as a schematic plan view of a stationary machine.

The moveable machine 140 of FIG. 23 is set up on wheels/rollers 144 so that it can move freely about. The machine is oriented to the wind by pinning or tethering the machine to the ground at a position 146 forward of the center of effort 148 of the machine, similar to a wind vane. In this fashion the movable machine 140 can move around position 146 and always be properly oriented to the wind. As shown in FIG. 23, this can be accomplished by securing the support structure 88 at a position 146 within the footprint 150 of the support structure or to a position 146a external of the support structure. In either case the wind direction will tend to properly orient the movable machine.

The moveable machine is so designed that the two long, near and far sections 152, 154 of the track-way rails 102 are parallel to each other. The two parallel sections 152, 154 of track-way rails 102 are kept at 90 degrees to the wind at all times by tethering or pinning the machine to position 146 or 146a, which acts as a grounded pivot point forward of the center of effort 148. Therefore the sail angle of incidence can be preset for a broad reach (sheeting in and out of the boom). In this manner the sails of the machine derive most of their power during the broad reach portions of their movement around the closed loop. The other two reaches, the upwind reach and the down wind reach along near and far sections 152, 154 may or may not add energy to the complete cycle, as the sheeting may not be optimally set to the angles of incidence.

As the velocity of the wind against the sails 94 increases, then the angle of incidence 156 of the sail to the wind has to become more acute in order for the sail to set correctly and derive the most energy from the sail. In the preset mode the sails will become inefficient if operated outside of a preset efficiency band (wind velocity too low or too high). Is presently expected that the efficiency band will be between about 15-25 knots. Therefore a basic movable machine that is tethered or pinned to the ground will work best within a wind velocity/power band.

Automatic Sheeting Angle of Incidence Method

Figure 25:
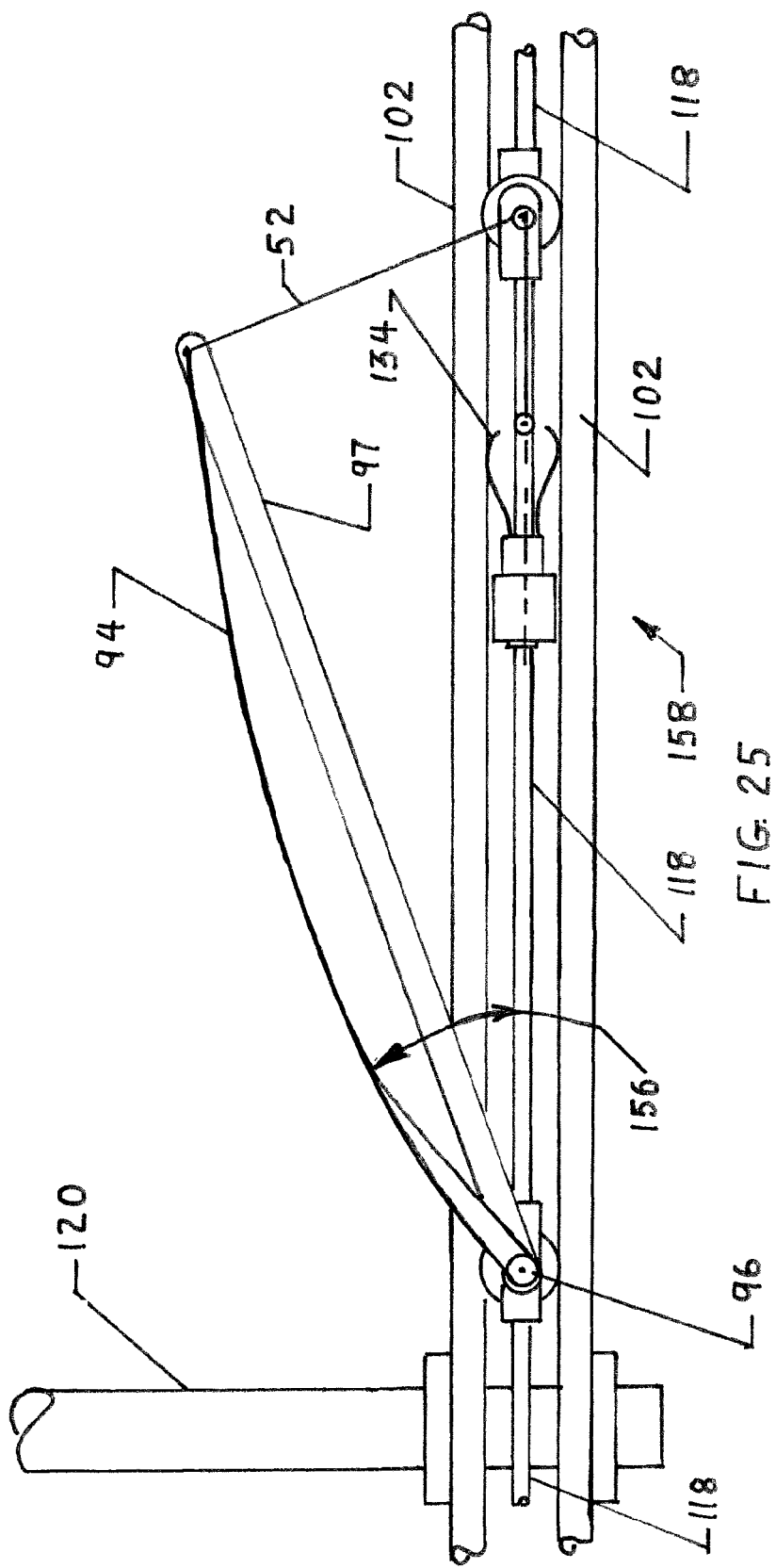
FIG. 25 is a plan view illustrating a sail arrangement and an automatic sheeting mechanism.

A more sophisticated machine can be built by using an appropriate system, such as an electro-mechanical servo system, that can monitor and set the angle of incidence 156, see FIG. 25, for each sail constantly and automatically. As mentioned above, automatic sheeting can be used for movable machines 140 and may be mandatory for stationary machines 142 when the wind direction is expected to change and efficiency is important.

The angle of incidence 156 to each sail 94 can be monitored and adjusted periodically or constantly by, for example, an electro-mechanical linear motion actuator system 158. See FIG. 25. This system 158 can be, for example, powered by an electrified track-way that is connected by brushes to the trackway or powered by a battery. Each sail actuator system 158 may, for example, set the proper sheeting angle for its sail (angle of incidence 156) via a remote control wind vane and anemometer interface.

With this added electro/mechanical ability, a moveable machine 140 can operate within a much larger wind velocity/power band. This electro-mechanical linear motion actuator system 158 makes it possible to operate conveyor type wind machines more efficiently. This system 158 also makes it possible to operate machines that are stationary and/or are too large to be of the moveable type. If each sail 94 can be sheeted in to the correct angle of incidence 156 to the wind at any point of the track by a servo actuator, then the structure and track-ways do not have to be aligned to the wind. By using this technology, conveyor type wind machines can be designed and built to traverse long distances across the landscape and produce large amounts of electricity.

Second Wind Machine Embodiment

FIGS. 26-33 discloses a second example of apparatus 10 for harnessing energy from wind. Apparatus 10 includes support structure 162 used to support and guide upper and lower trolley trains 164 along a closed loop path 168. Trolley trains 164 include trolleys 170 with sail assemblies 172 mounted to and between the trolleys of the upper and lower trolley trains. Trolley trains 164 are preferably continuous loop trolley trains. Closed loop path 168 preferably has straight sections and curved sections with curved sections having radii sufficiently large to help reduce excessive friction and binding of the trolley trains 164. In one example and minimum radius of 10 feet (3 m) is preferred.

Referring now to FIGS. 27-30, trolley 170 is seen to include a roller 174 rotatably secured between roller supports 176. Adjacent trolleys 170 are secured to one another by a connector 178. Connector 178 includes end portions 180 rigidly secured to and between roller supports 176 by a pair of connector mounting plates 182. Connector mounting plates 182 both secure end portions 180 to trolley 170 and also act as spacers between roller supports 176 and help provide sufficient structural integrity for the trolley. Connector 178 also includes a central portion 184 made of a stiff, but flexible material, such as a glass fiber laminate, wood, metal or other appropriate material. Central portion 184 has a thickness 186 and a height 188, the height being greater than the thickness. This permits central portion 184 to bend or flex in the plane of FIG. 27 but substantially inhibits bending or flexing in other planes. The advantage of this will be discussed below.

Figure 31:
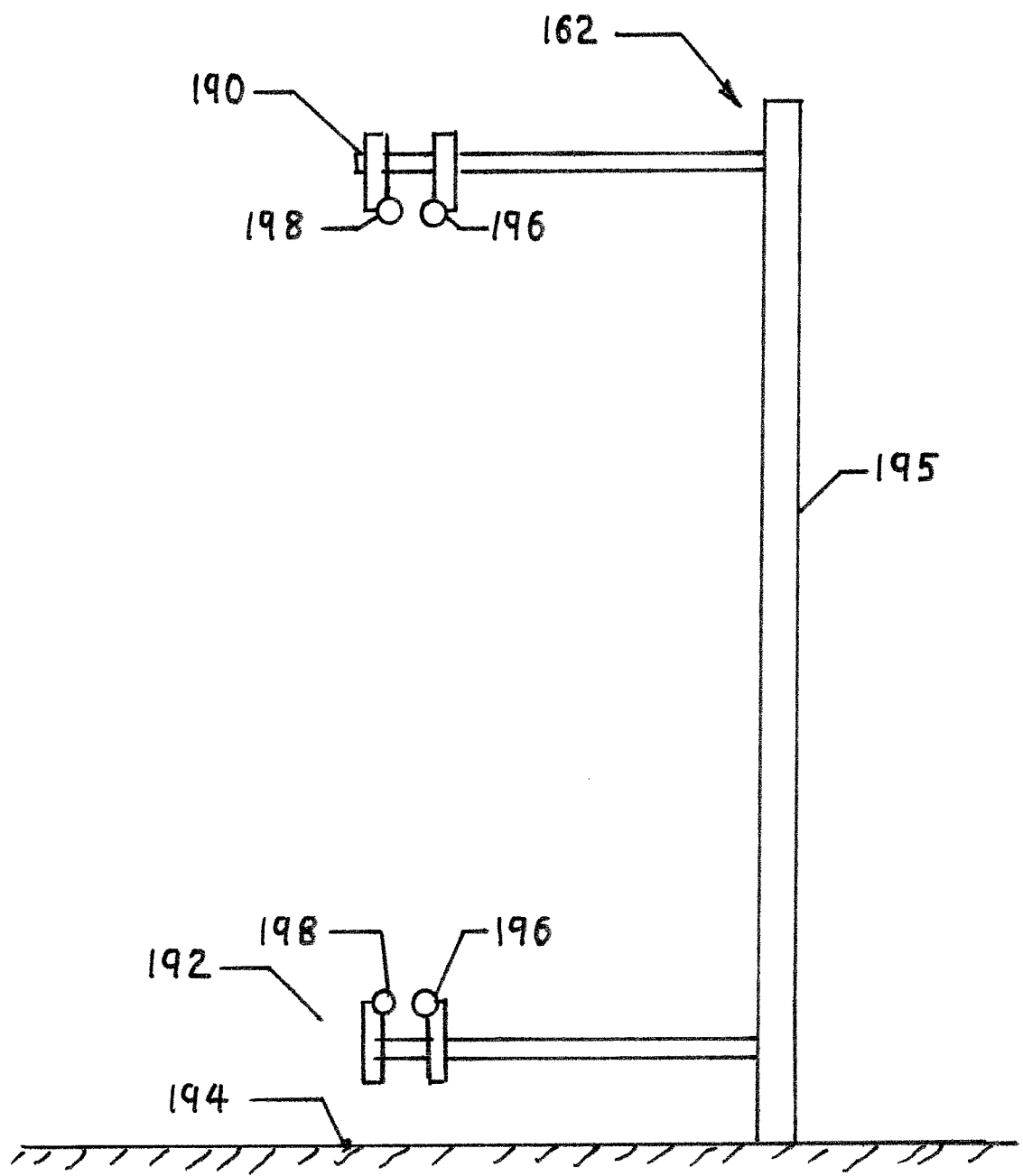

Support structure 162 includes upper and lower, closed loop trackways 190, 192, see FIG. 31, with upper and lower trackways 190, 192 supported above the ground 194, or other support surface, by a series of support stanchions 195. Lower trackway 192 will be described in more detail with the understanding that upper trackway 190 is essentially similar but inverted and thus will not be described separately. Lower trackway 192 includes inner and outer trackway rails 196, 198 situated parallel to each other, lying in a horizontal plane and separated by a generally constant distance 200. Trackway rails 196, 198 have convex surfaces 202 shaped for complementary mating engagement with the opposed roller surface 204 of roller 174. Distance 200 is chosen to provide a suitable gap 206 between surfaces 202, 204. Gap 206 is large enough to allow roller 174 to freely roll along one of trackway rails 196, 198 without binding on the other, but small enough to maintain roller 174 between trackway rails 196, 198.

Figure 26:
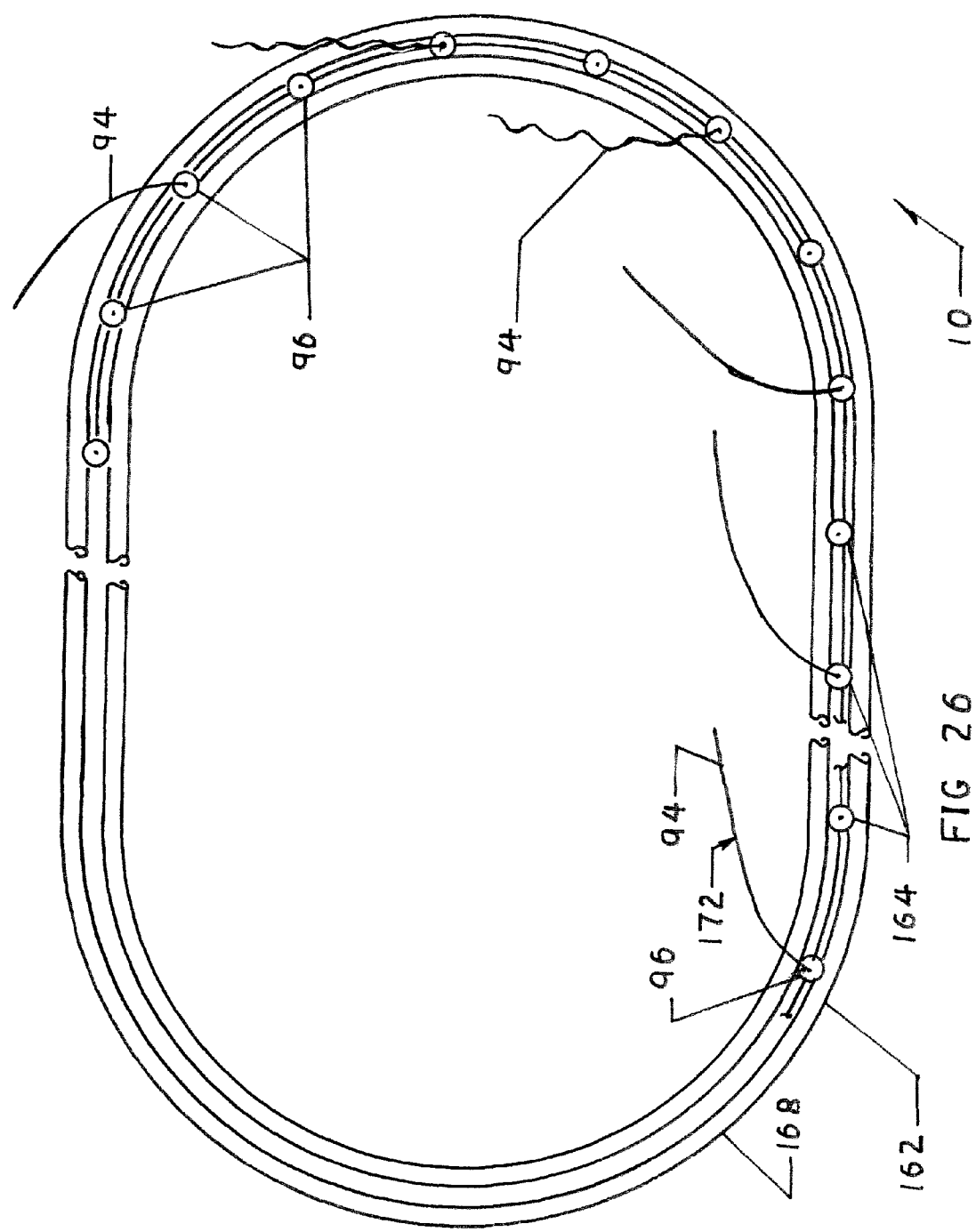

Sail assemblies 172 are similar to the sails 94 and masts 96 discussed above with regard to FIG. 12. Mast 96 is mounted to trolley 170 to extend from a mast connection 208 extending from roller 174 and extends collinearly with the axis of roller 174. However, connectors 178 do not connect directly to masts 96 but rather to trolley 170. In this way connector 178 lies between and in the same plane as defined between trackway rails 196, 198. This helps to reduce off-axis forces on masts 96 to help prevent misaligiunent, increased friction and binding. The flexible nature of central portion 184 permits trolley train 164 to move along curved portions of path 168. As shown in FIG. 26, in the disclosed embodiment sail assemblies 172 are mounted to every other trolley 170 so that connectors 178 can be shorter than would otherwise be required. This helps prevent binding when traveling around curved portions of path 168. In addition, the use of larger radius bends for path 168 helps to prevent excessive bending of central portion 184 of connectors 178, which could otherwise cause the connectors to fail. The rigid connection between connector 178 and trolley 170 helps to maintain masts 96 parallel to one another and in the proper vertical orientation.

Figure 32:
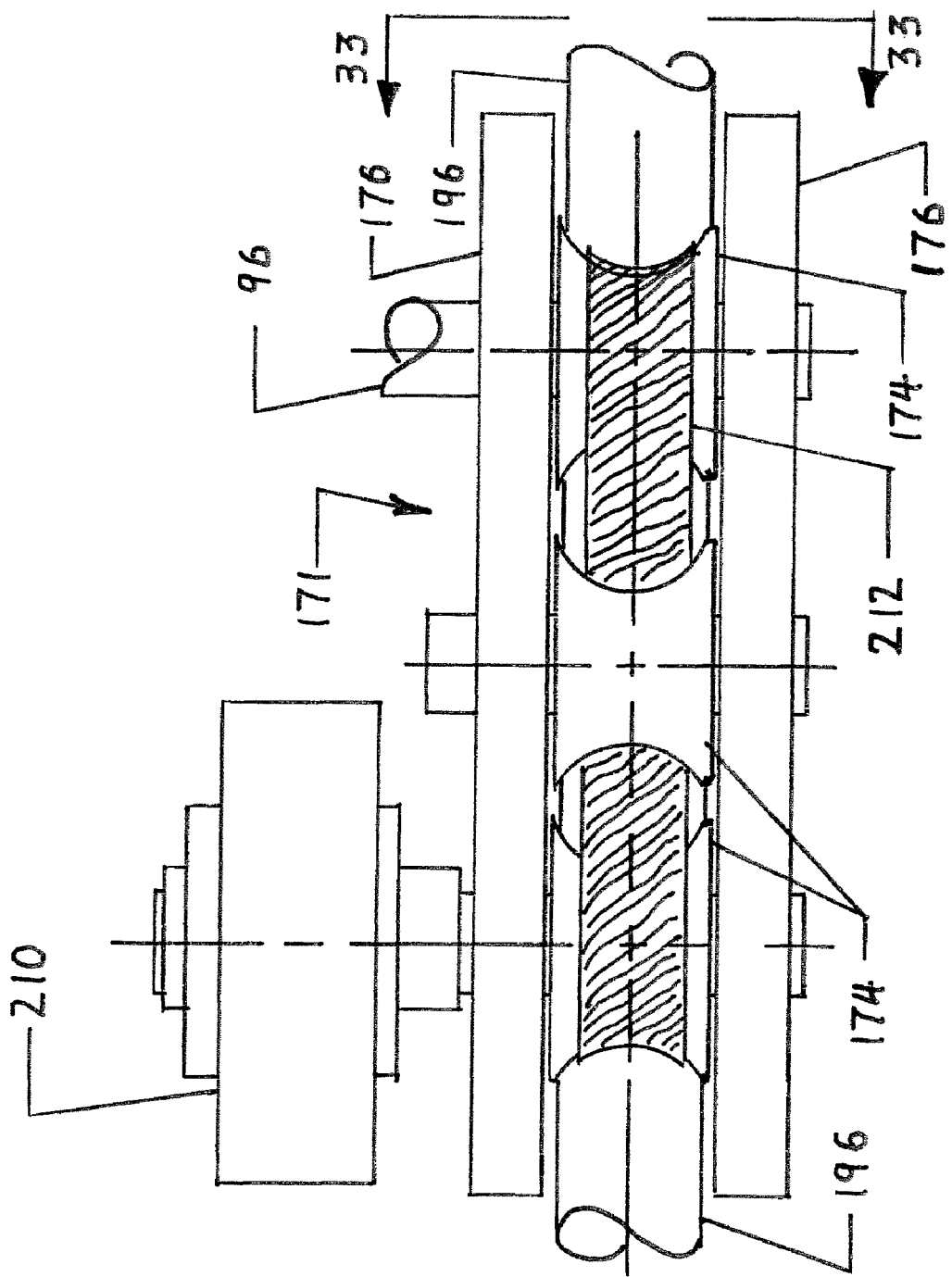
Figure 33:
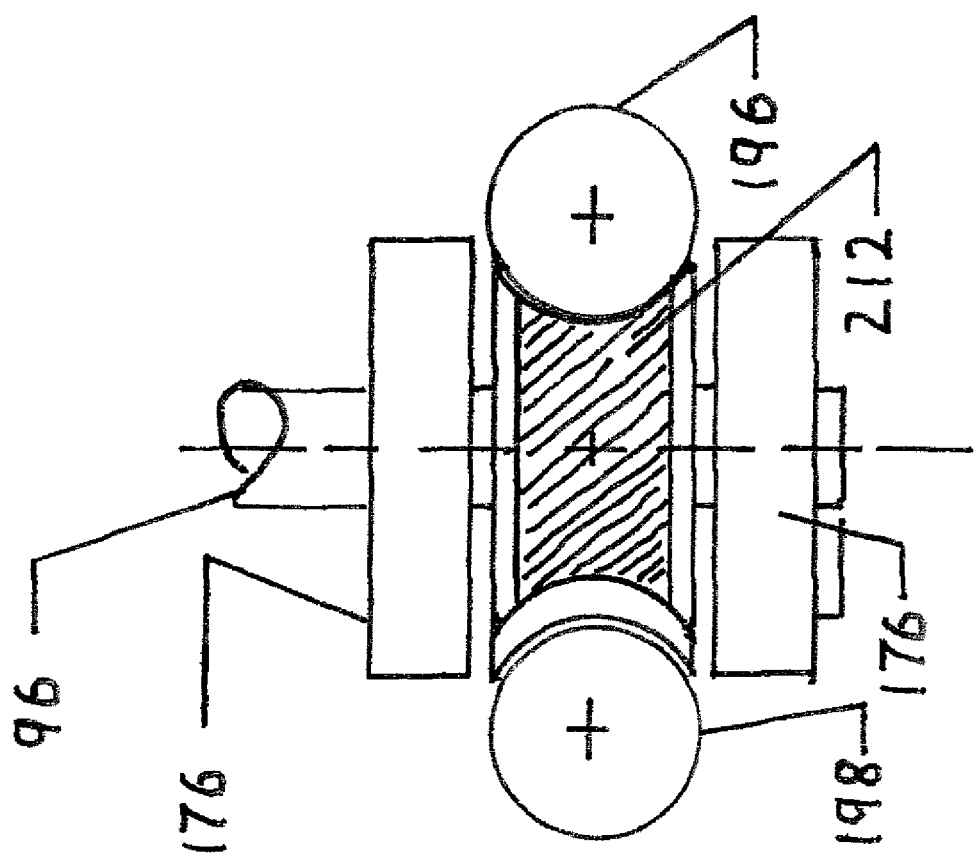

FIGS. 32 and 33 show a trolley 171 adapted to carry a generator 210. Generator trolley 171 has three rollers 174 with a drive belt 212 passing around the end rollers. The middle roller is positioned and is sized to provide a tension on belt 212, engage, for example, trackway rail 198 and press the outer rollers 174 against trackway rail 196 with drive belt 212 squeezed between the outer rollers 174 and trackway rail 196. The middle roller 174 can be fixed in position, have its position adjustable relative to the other two rollers 174, be spring biased against drive belt 212, or a combination thereof. Thus, as trolley 171, which may or may not have a sail assembly 172 mounted thereto, moves along path 168, drive belt 212 rotates the roller 174 connected to generator 210 causing a generator to produce electricity. The electricity generated can be delivered from generator 210 in various ways, including those discussed above.

The above descriptions may have used terms such as above, below, top, bottom, over, under, et cetera. These terms are used to aid understanding of the invention are not used in a limiting sense.

While the present invention is disclosed by reference to the preferred embodiments and examples detailed above, it is to be understood that these examples are intended in an illustrative rather than in a limiting sense. It is contemplated that modifications and combinations will occur to those skilled in the art, which modifications and combinations will be within the spirit of the invention and the scope of the following claims. For example, trackway tubing 102 may be hollow tubing, a semi hollow tubing, filled tubing, effectively solid structure, or other elongate structure sized and shaped to be engaged by appropriately sized and shaped rollers.

Any and all patents, patent applications and printed publications referred to above are incorporated by reference.

The invention claimed is:

1. Apparatus for harnessing energy from wind comprising:
   a support structure comprising upper and lower closed loop trackways defining a closed loop path;
   movable wind foils, each wind foil having a mast engaging and guided by the upper and lower trackways;
   a mast connecting assembly connecting the masts of a series of the wind foils to one another so that the series of wind foils can move along the path; and
   each wind foil being movable between a first orientation, when moving along a first portion of the path, and a second orientation, when moving along a second portion of the path;
   means for changing the orientation of the support structure according to the direction of ambient wind;
   the orientation changing means comprising means for supporting the support structure on a support surface for movement around a fixed point; and
   the path defining an interior region and an exterior region and the fixed point is located within the exterior region.

2. The apparatus according to claim 1 further comprising an electrical generator connected to and moved along with at least one of the masts and the mast connecting assembly so to harness energy from the wind.

3. The apparatus according to claim 1 wherein the mast connecting assembly is a continuous loop.

4. The apparatus according to claim 1 wherein the mast connecting assembly comprises a plurality of fixed length connectors between adjacent masts.

5. The apparatus according to claim 1 wherein:
   the path has first and second reaches, said first and second reaches being upflow and downflow reaches when fluid flows from the first reach to the second reach;
   each wind foil comprises first and second sides; and
   the first orientation is situated in the interior region when a wind foil is moving along the upflow reach, and a second orientation situated in the exterior region when a wind foil is moving along the downflow reach, so that:
      the first sides are generally concave when moving along the upflow reach and generally convex when moving along the downflow reach; and
      the second sides are generally concave when moving along the downflow reach and generally convex when moving along the upflow reach.

6. The apparatus according to claim 1 wherein the series of wind foils comprises a continuous loop series of wind foils extending along the entire path.

7. Apparatus for harnessing energy from wind comprising:
   a support structure comprising upper and lower closed loop trackways defining a closed loop path;
   each trackway comprising inner and outer trackway rails spaced apart from one another at a chosen separation;
   trolleys along the upper and lower trackways, each trolley comprising a roller mounted to a roller support, the roller positioned between, engageable with, movable along and guided by at least one of the inner and outer rails of the upper and lower trackways;
   the roller support comprising upper and lower cheek plates capturing the roller therebetween;
   the roller and the inner and outer trackway rails having opposed surfaces shaped to permit the roller to move freely along the trackway rails while supporting the trolley on the trackway rails;
   a connector connecting adjacent trolleys of a series of the trolleys to one another to create a trolley train movable along each of the upper and lower trackways;
   each connector comprising central and end portions, the end portions rigidly secured to the roller supports of adjacent trolleys, the central portion being flexible in at least one plane, the central portion positioned between the inner and outer trackway rails; and sail assemblies, each sail assembly having a mast having upper and lower ends and a sail extending from the mast, the upper and lower ends of the mast mounted to and supported by upper and lower trolleys.

8. The apparatus according to claim 7 wherein the roller and the trackway rails have complementary semi-cylindrical surfaces.

9. The apparatus according to claim 7 wherein the chosen separation creates a gap between the roller and at least one of the inner and outer rails.

10. The apparatus according to claim 7 wherein the roller has a roller axis and the mast is collinear with the roller axis.

11. The apparatus according to claim 7 wherein the connector comprises a length of stiff but flexible material.

12. The apparatus according to claim 7 wherein each sail is movable between a first orientation, when moving along a first portion of the path, and a second orientation, when moving along a second portion of the path.

13. The apparatus according to claim 7 wherein the sail assemblies are mounted to every other trolley of the series of trolleys along each of the upper and lower trolleys.

14. The apparatus according to claim 7 further comprising an electrical generator carried by at least one of the trolleys so to harness energy from the wind.

15. The apparatus according to claim 7 wherein the trolley train is a continuous loop.

16. The apparatus according to claim 7 wherein:
the path defines an interior region and an exterior region;
the path has first and second reaches, said first and second reaches being upflow and downflow reaches when fluid flows from the first reach to the second reach;
each sail comprises first and second sides; and
the first orientation is situated in the interior region when a sail moves along the upflow reach, and a second orientation situated in the exterior region when a sail moves along the downflow reach, so that:
the first sides are generally concave when moving along the upflow reach and generally convex when moving along the downflow reach; and
the second sides are generally concave when moving along the downflow reach and generally convex when moving along the upflow reach.

17. Apparatus for harnessing energy from wind comprising:
a support structure comprising upper and lower closed loop trackways defining a closed loop path;
each trackway comprising inner and outer trackway rails spaced apart from one another at a chosen separation;
trolleys along the upper and lower trackways, each trolley comprising a roller mounted to a roller support, the roller positioned between, engageable with, movable along and guided by at least one of the inner and outer rails of the upper and lower trackways;
the roller and the inner and outer trackway rails having opposed surfaces shaped to permit the roller to move freely along the trackway rails while supporting the trolley on the trackway rails;
a connector connecting adjacent trolleys of a series of the trolleys to one another to create a trolley train movable along each of the upper and lower trackways;
each connector comprising central and end portions, the end portions rigidly secured to the roller supports of adjacent trolleys, the central portion of the connector being resilient, the central portion being flexible in at least one plane, the central portion positioned between the inner and outer trackway rails; and
sail assemblies, each sail assembly having a mast having upper and lower ends and a sail extending from the mast, the upper and lower ends of the mast mounted to and supported by upper and lower trolleys.

18. The apparatus according to claim 17 wherein the inner and outer trackway rails defined a tracking plane, and the central portion being flexible only in said tracking plane.

* * * * *